(12) United States Patent
Lewis et al.

(10) Patent No.: US 9,117,118 B1
(45) Date of Patent: Aug. 25, 2015

(54) SYSTEMS AND METHODS FOR CAPTURING AND PROCESSING DOCUMENTS

(71) Applicant: Fast Yeti, Inc., University Place, WA (US)

(72) Inventors: Kenneth J. Lewis, Tacoma, WA (US); Linda E. Brooks Rix, Lakewood, WA (US)

(73) Assignee: Fast Yeti, Inc., University Place, WA (US)

( * ) Notice: Subject to any disclaimer, the term of this patent is extended or adjusted under 35 U.S.C. 154(b) by 0 days.

(21) Appl. No.: 14/605,183

(22) Filed: Jan. 26, 2015

(51) Int. Cl.
H04N 1/04 (2006.01)
G06K 9/00 (2006.01)
H04N 1/00 (2006.01)
H04N 1/40 (2006.01)
G06K 9/22 (2006.01)
G06K 9/32 (2006.01)
G06K 9/78 (2006.01)

(52) U.S. Cl.
CPC ........ *G06K 9/00483* (2013.01); *G06K 9/00449* (2013.01); *G06K 9/00463* (2013.01); *G06K 9/228* (2013.01); *G06K 9/32* (2013.01); *G06K 9/78* (2013.01); *H04N 1/0044* (2013.01); *H04N 1/00702* (2013.01); *H04N 1/00737* (2013.01); *H04N 1/00761* (2013.01); *H04N 1/00782* (2013.01); *H04N 1/00816* (2013.01); *H04N 1/40062* (2013.01); *H04N 2201/0081* (2013.01)

(58) Field of Classification Search
CPC .......... G06K 9/00483; G06K 9/00449; G06K 9/00463; G06K 9/228; H04N 1/0044; H04N 1/00702; H04N 1/00737; H04N 1/00761; H04N 1/00782; H04N 1/00816
USPC ................................ 358/1.9, 1.14, 1.13, 1.15
See application file for complete search history.

(56) References Cited

U.S. PATENT DOCUMENTS

| | | | |
|---|---|---|---|
| 8,774,471 B1 | 7/2014 | Laaser et al. | |
| 8,799,049 B2 | 8/2014 | Ramanujan et al. | |
| 8,880,430 B1 | 11/2014 | Wang et al. | |
| 2013/0036347 A1 | 2/2013 | Eftekhari et al. | |
| 2014/0149303 A1* | 5/2014 | Band et al. | 705/322 |
| 2014/0244456 A1 | 8/2014 | Huang et al. | |

OTHER PUBLICATIONS

Snap It. Tap It. Done. Obtained from https://turbotax.intuit.com/snaptax/mobile/ on Dec. 1, 2014.

* cited by examiner

*Primary Examiner* — Houshang Safaipour
(74) *Attorney, Agent, or Firm* — Crowell & Moring LLP

(57) ABSTRACT

Systems and methods for processing documents involve directing an imager at a document and automatically capturing the document when predetermined criteria are satisfied. The captured document can then be subjected to image processing, including separating the document into individual data field images and performing optical character recognition (OCR) processing on the individual data fields so extract data that can then be used to determine eligibility for benefits.

17 Claims, 52 Drawing Sheets

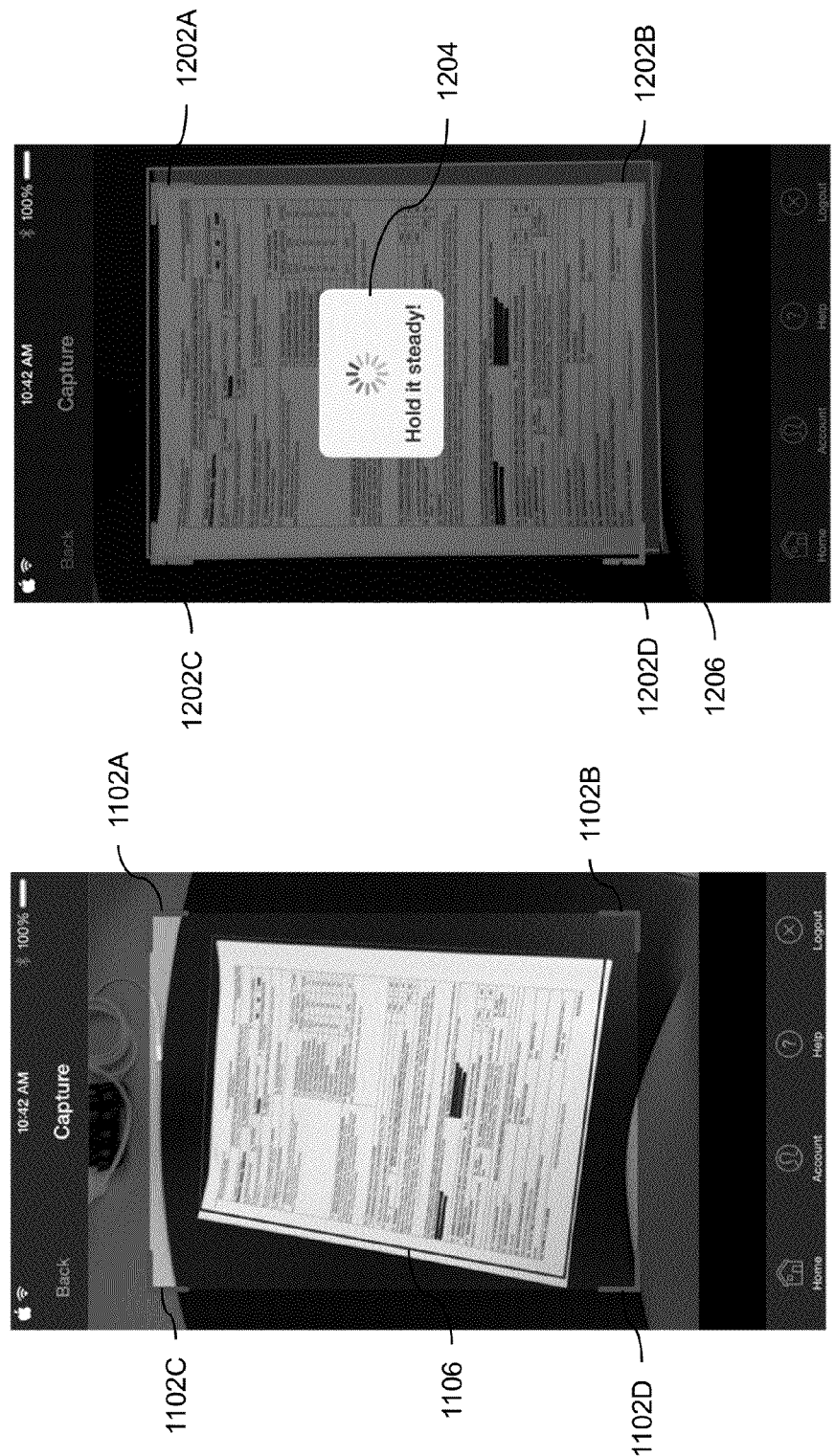

SYSTEMS AND METHODS FOR CAPTURING AND PROCESSING DOCUMENTS

BACKGROUND OF THE INVENTION

Exemplary embodiments of the present invention are directed to systems and methods for capturing and processing documents.

Although technology has provided ways to electronically deliver documents for quite some time, it is still very common to receive documents in paper form. It is also quite common for a person to use the information contained in a document for other purposes. For example, people typically must take information contained on tax forms and enter this information either manually onto paper forms or into tax preparation software for filing. Manual data entry is not only tedious but also subject to keying errors.

One solution is to capture tax forms using the camera that is part of a mobile device. For example, Intuit offers a mobile application called SnapTax, which requires a user to use align a W-2 form within a predetermined area of the camera's screen and then click the shutter button. The data contained on the captured W-2 form is extracted and combined with additional information provided by a user to complete a form 1040A.

Intuit advertises the SnapTax application as being available for persons who do not own a home, only have W-2, interest, or unemployment income, and earned less than $100K (or $120K if married) in 2012. Further, Intuit advertises that the SnapTax application captures a photograph of a W-2 form but does not advertise the ability to capture photographs of interest income statement forms or unemployment income forms.

SUMMARY OF THE INVENTION

Although the SnapTax application provides some automation in entry of information from one document to another, it appears to be quite limited. Specifically, it appears the SnapTax application is limited to capturing information from a W-2 form, which has relatively standard layout. The SnapTax application does not appear to have the capability to capture information from state unemployment income forms, which can have different layouts from one state to the next. Further, the SnapTax application appears to be limited to applying a relatively small subset of IRS regulations to the captured data because the application is limited to those that can qualify for filing a 1040A form, which is designed for only the most simple tax filing situations.

Exemplary embodiments of the present invention are directed to novel and inventive systems and methods for processing documents. In accordance with the present invention a processor determines whether imager data satisfies predetermined criteria, and if so the imager automatically captures an image. The processor identifies a document contained in the captured image, separates the document into separate data field images, recognizes text in each of the separate data field images, and automatically identifies a form in the imager data based on the recognized text in one of the separate data fields. The processor can then determine eligibility for one or more benefits based on the recognized text in the separate data field images.

Other objects, advantages and novel features of the present invention will become apparent from the following detailed description of the invention when considered in conjunction with the accompanying drawings.

BRIEF DESCRIPTION OF THE DRAWING FIGURES

FIGS. 11 and 12 are screenshots of exemplary document capture screens in accordance with the present invention;

Figure 21B:
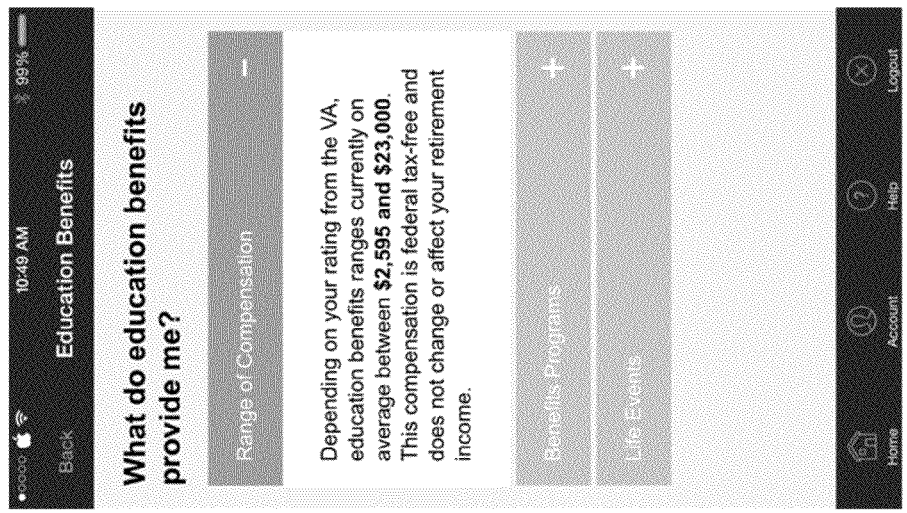
Figure 21A:
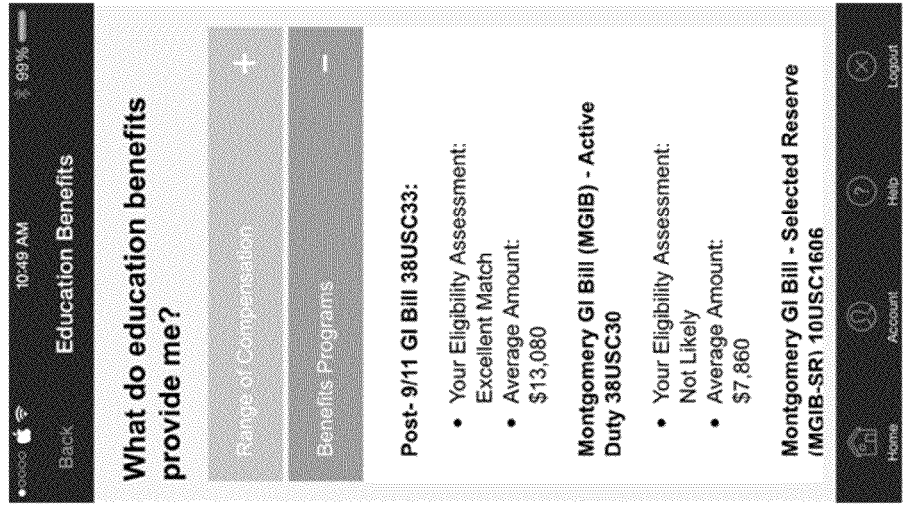
Figure 22A:
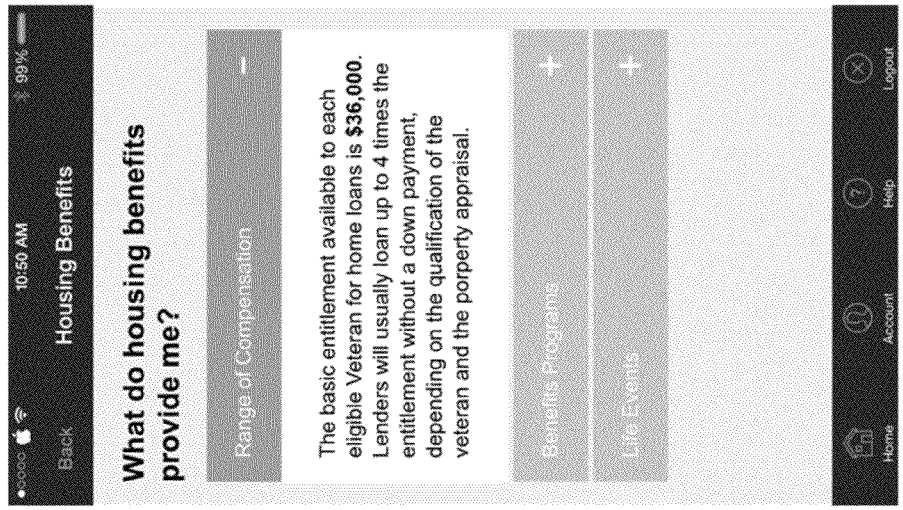
Figure 21C:
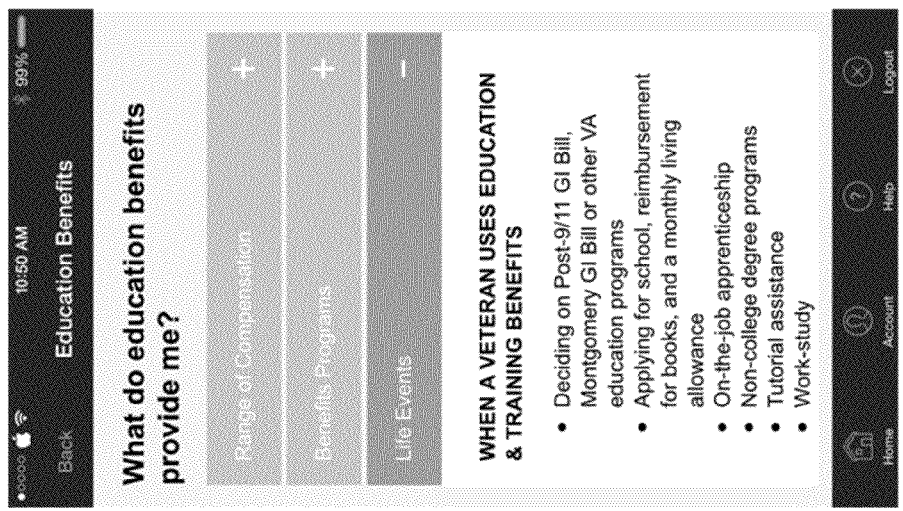
Figure 22C:
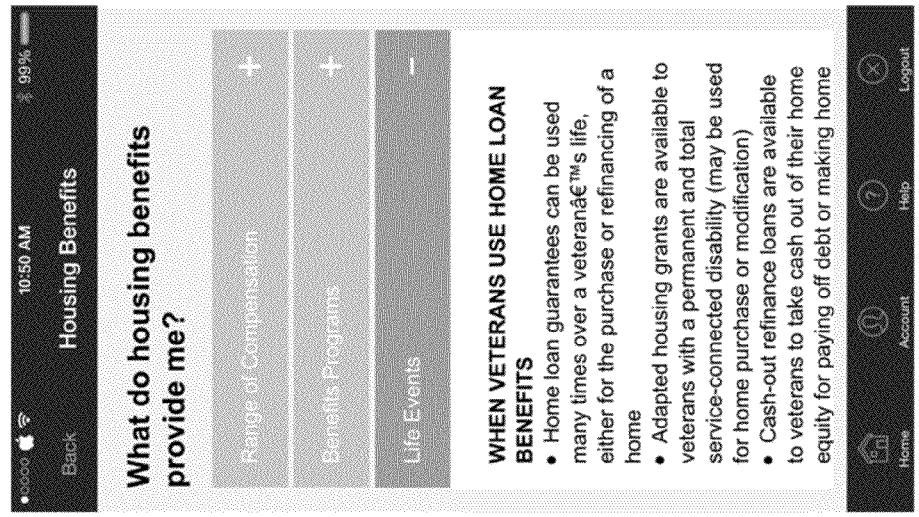
Figure 22B:
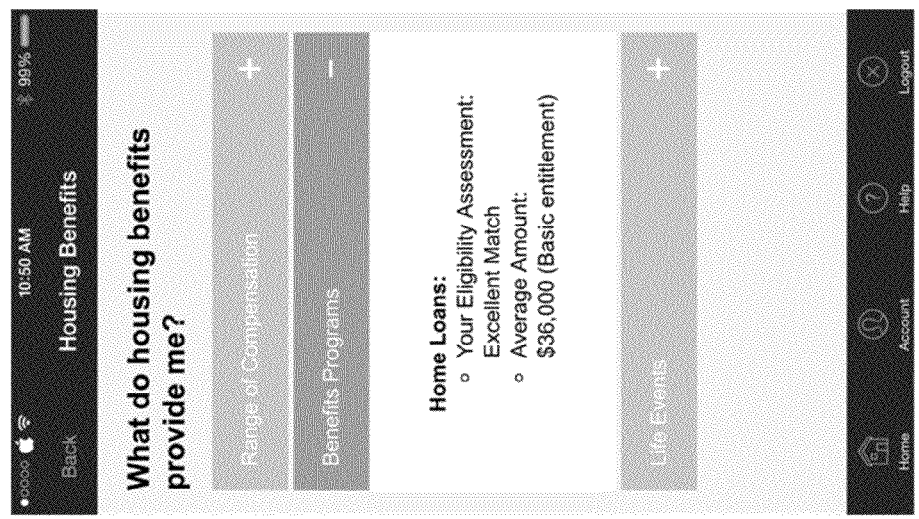
Figure 23:
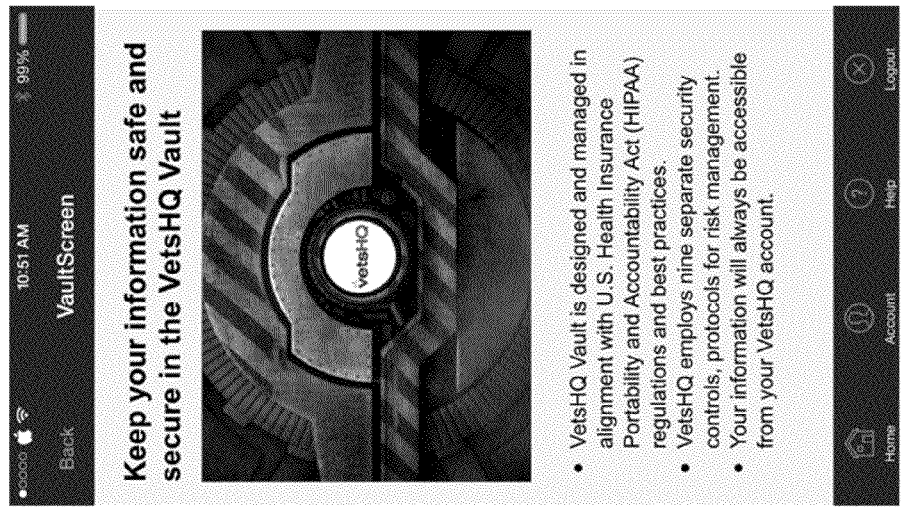
Figure 25A:
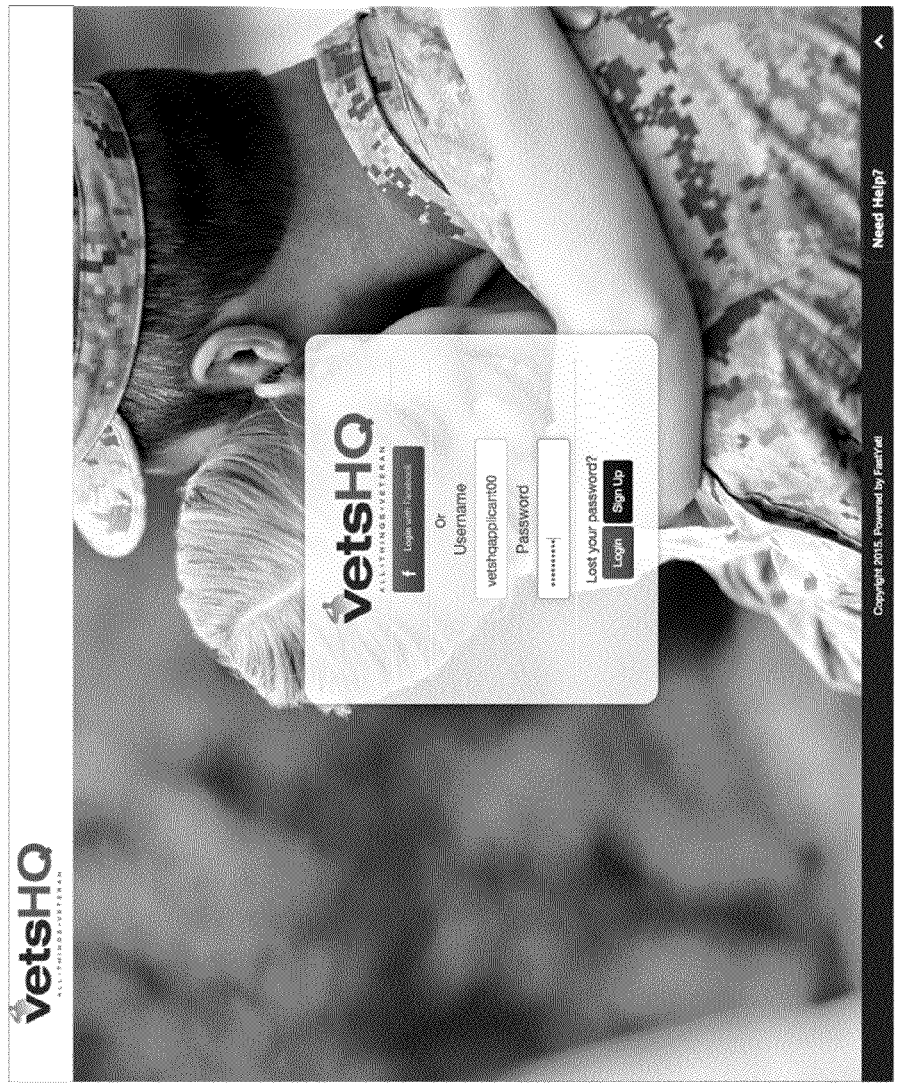

15B illustrates an exemplary raw image with a largest 4-point contour in accordance with the present invention;

Figure 16:
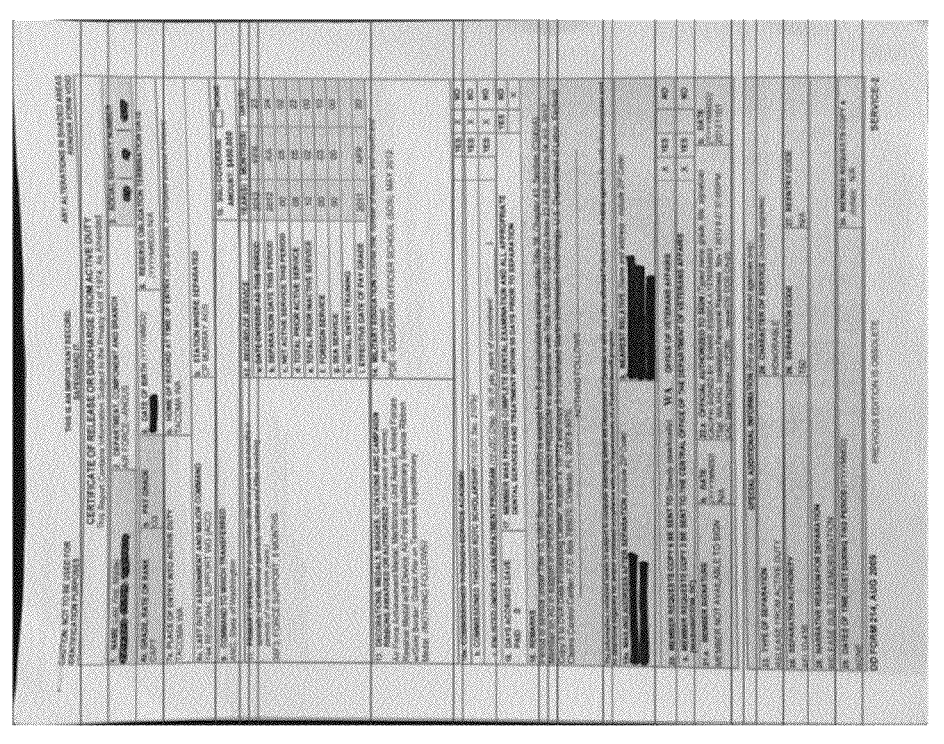

FIG. 16 illustrates a captured document that has been subjected to nested table layout processing in accordance with the present invention;

FIGS. 17A-17E illustrate fields separated from the captured document in accordance with the present invention;

Figures 18A, 18B:
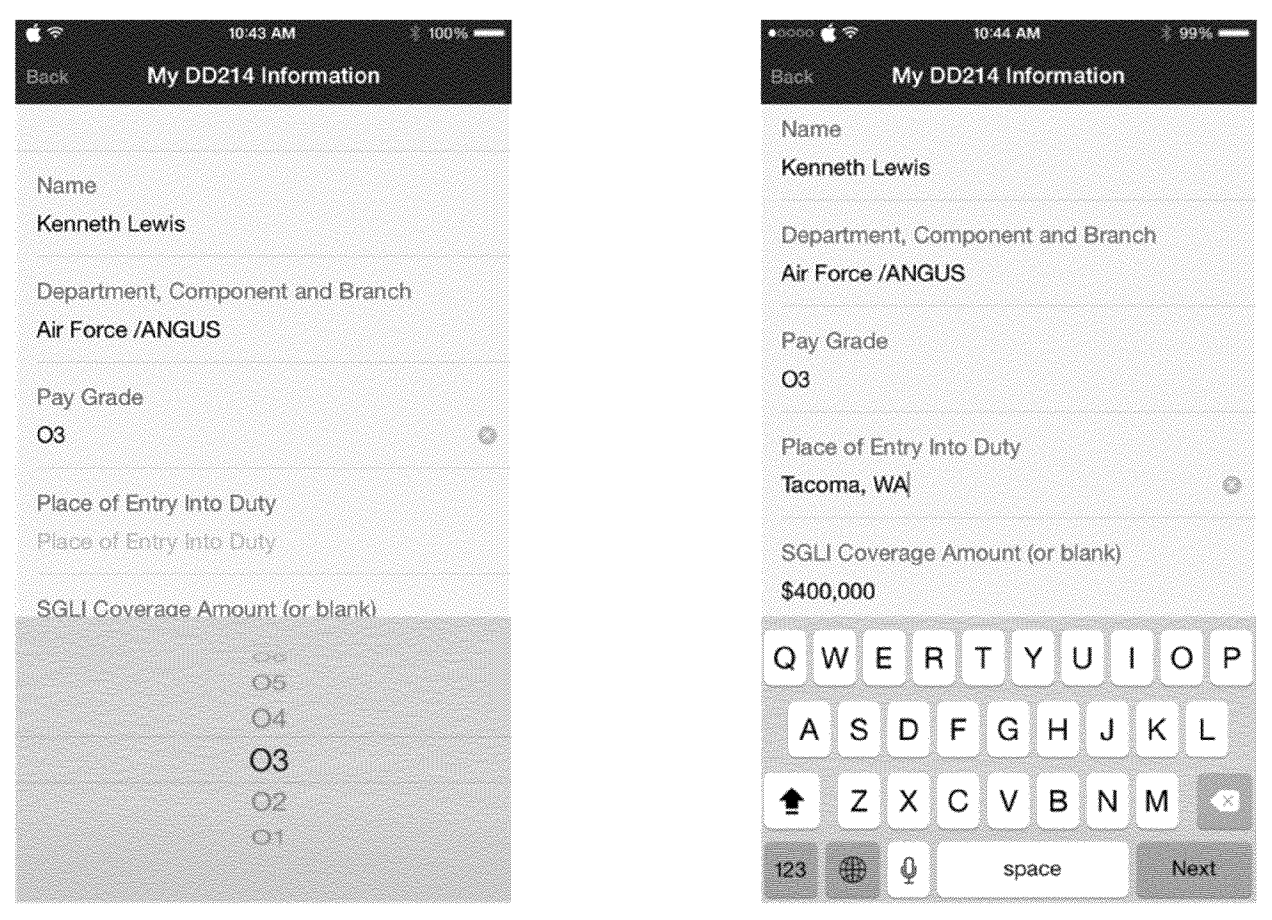

FIGS. 18A and 18B illustrate screenshots of exemplary data verification screens in accordance with the present invention;

Figures 19, 20A:
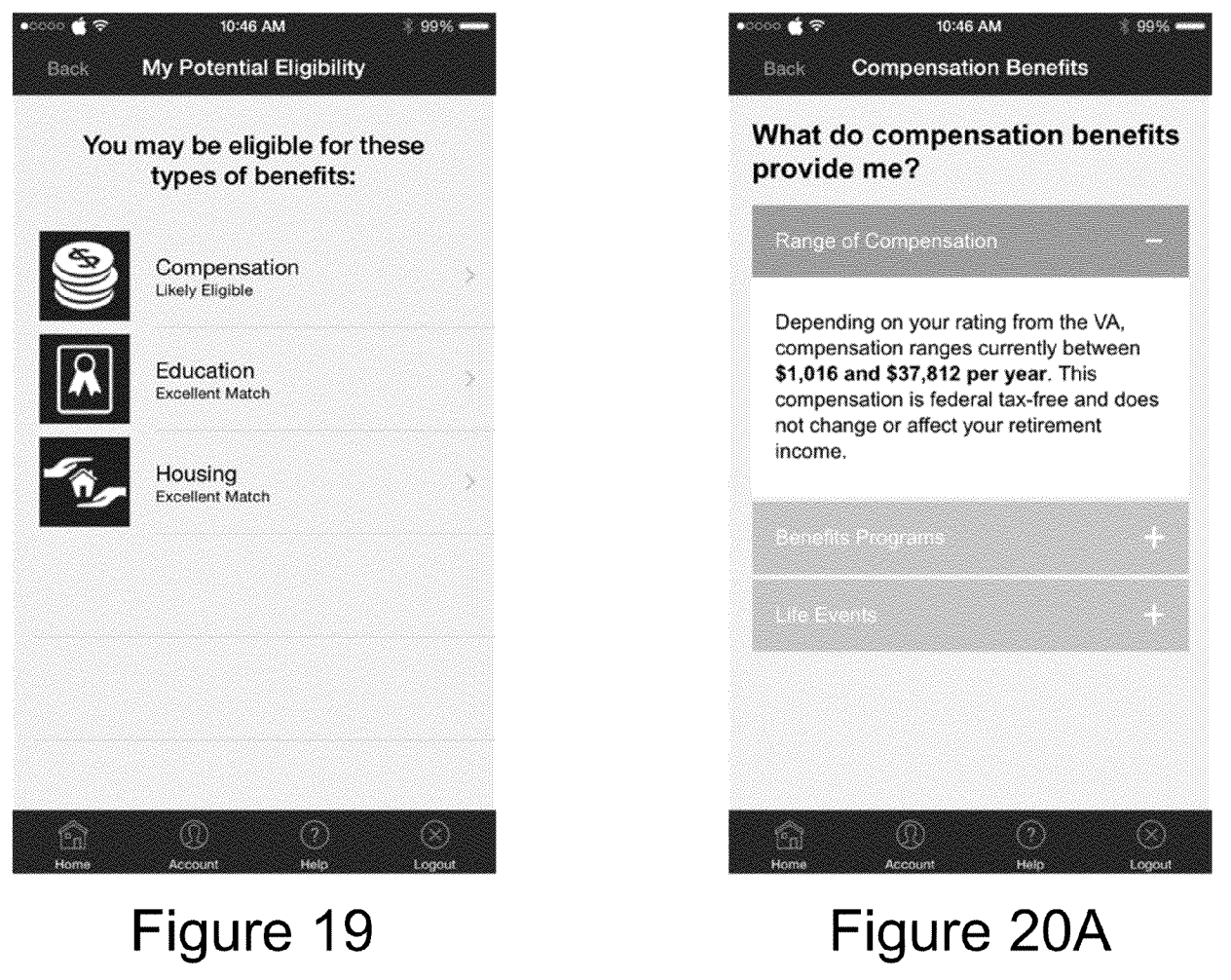

FIG. 19 illustrates a screenshot of an exemplary benefit eligibility indication screen in accordance with the present invention;

Figures 20B, 20C:
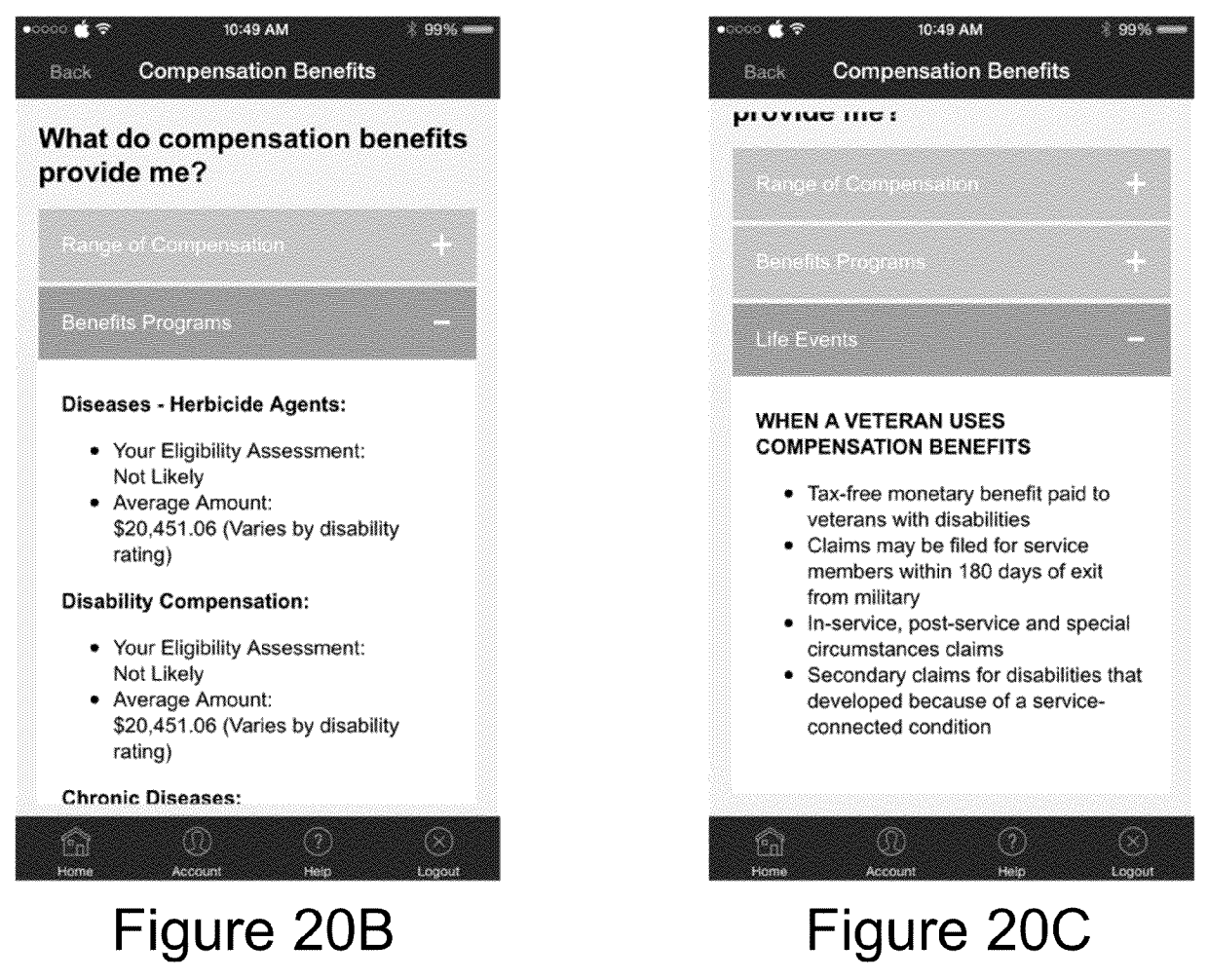

FIGS. 20A-20C are screenshots of exemplary compensation benefits screens in accordance with the present invention;

FIGS. 21A-21C are screenshots of exemplary education benefits screens in accordance with the present invention;

FIGS. 22A-22C are screenshots of exemplary housing benefits screens in accordance with the present invention;

FIG. 23 is a screenshot of an exemplary submission verification screen in accordance with the present invention;

Figures 24A, 24B:
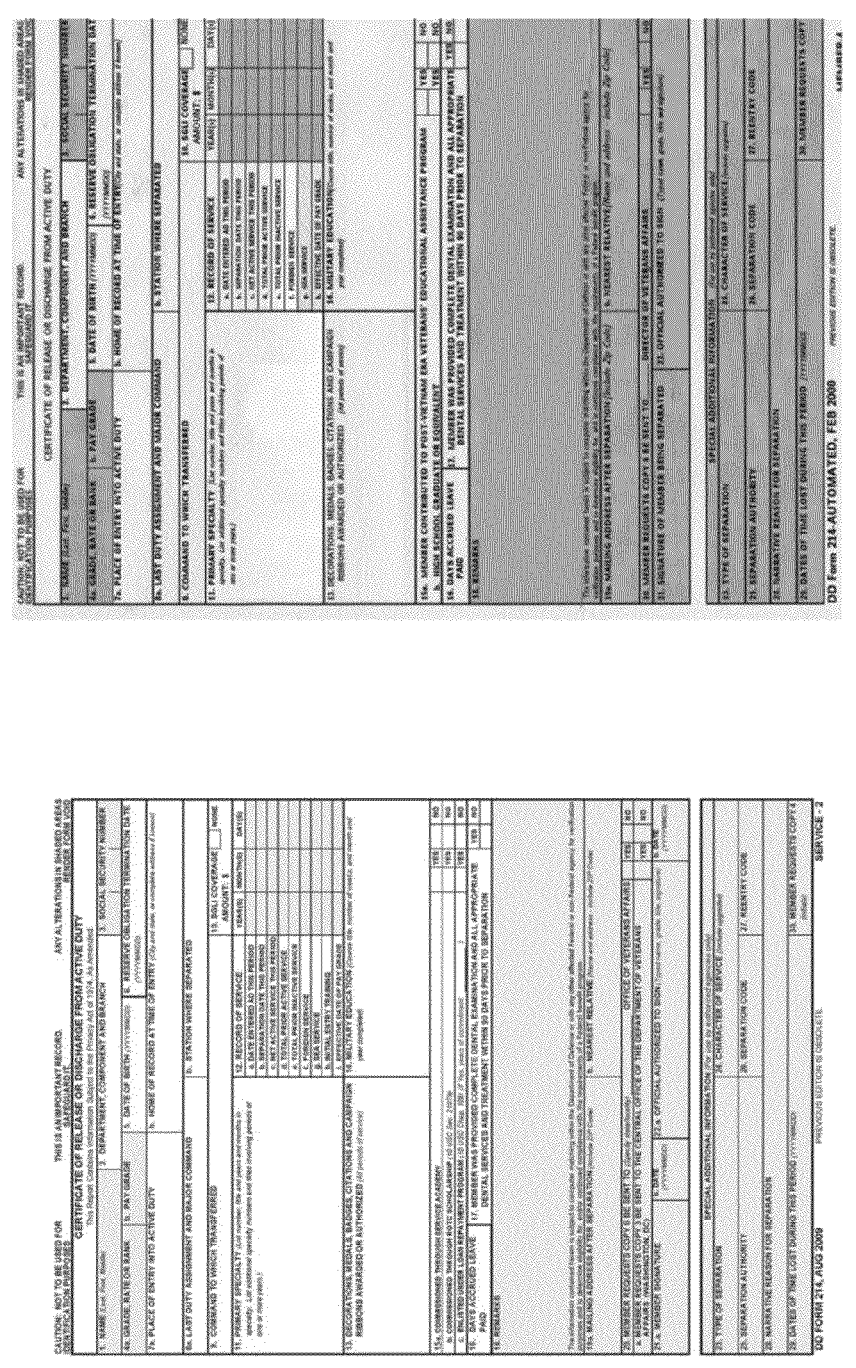
Figures 24C, 24D:
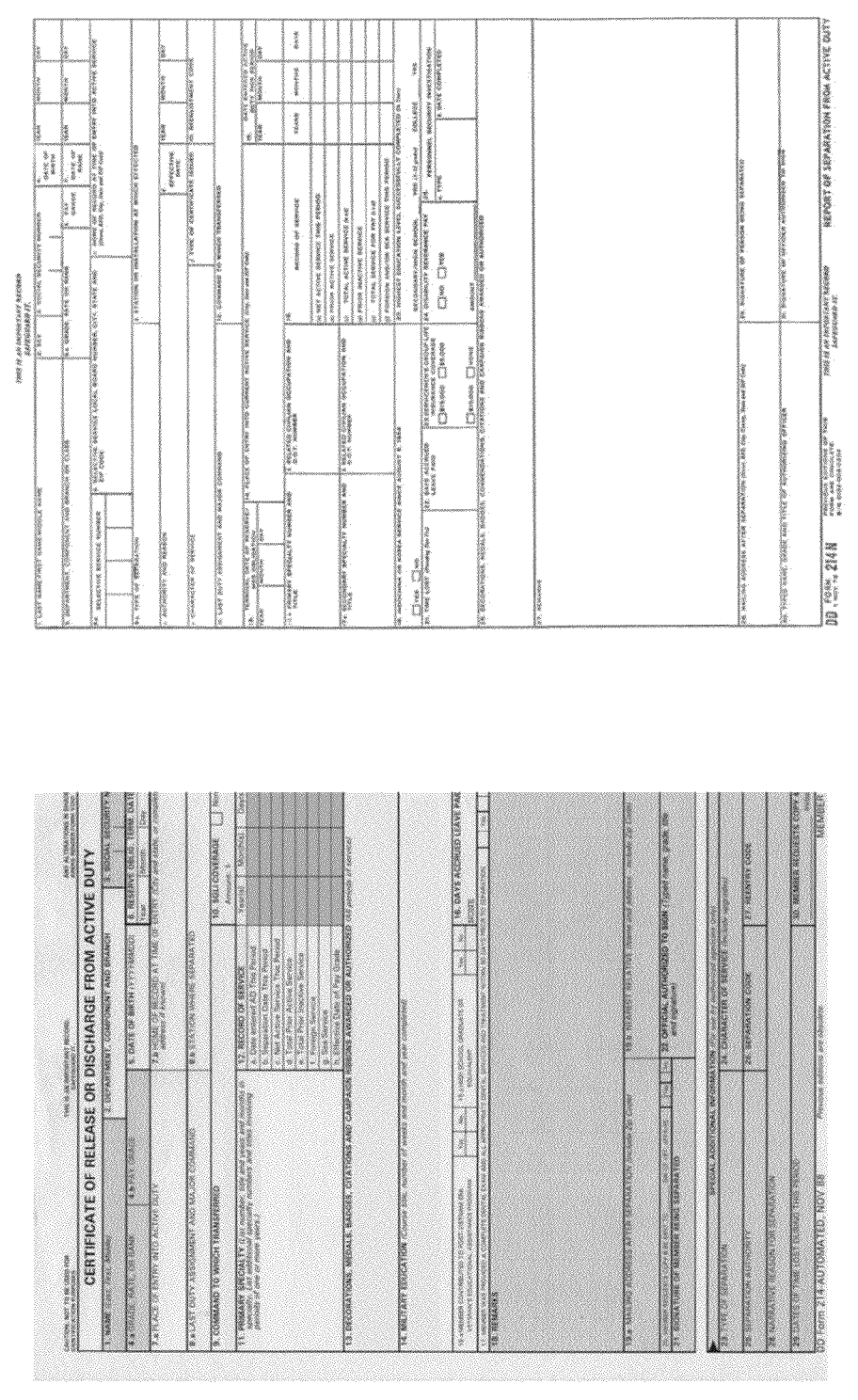
Figures 24E, 24F:
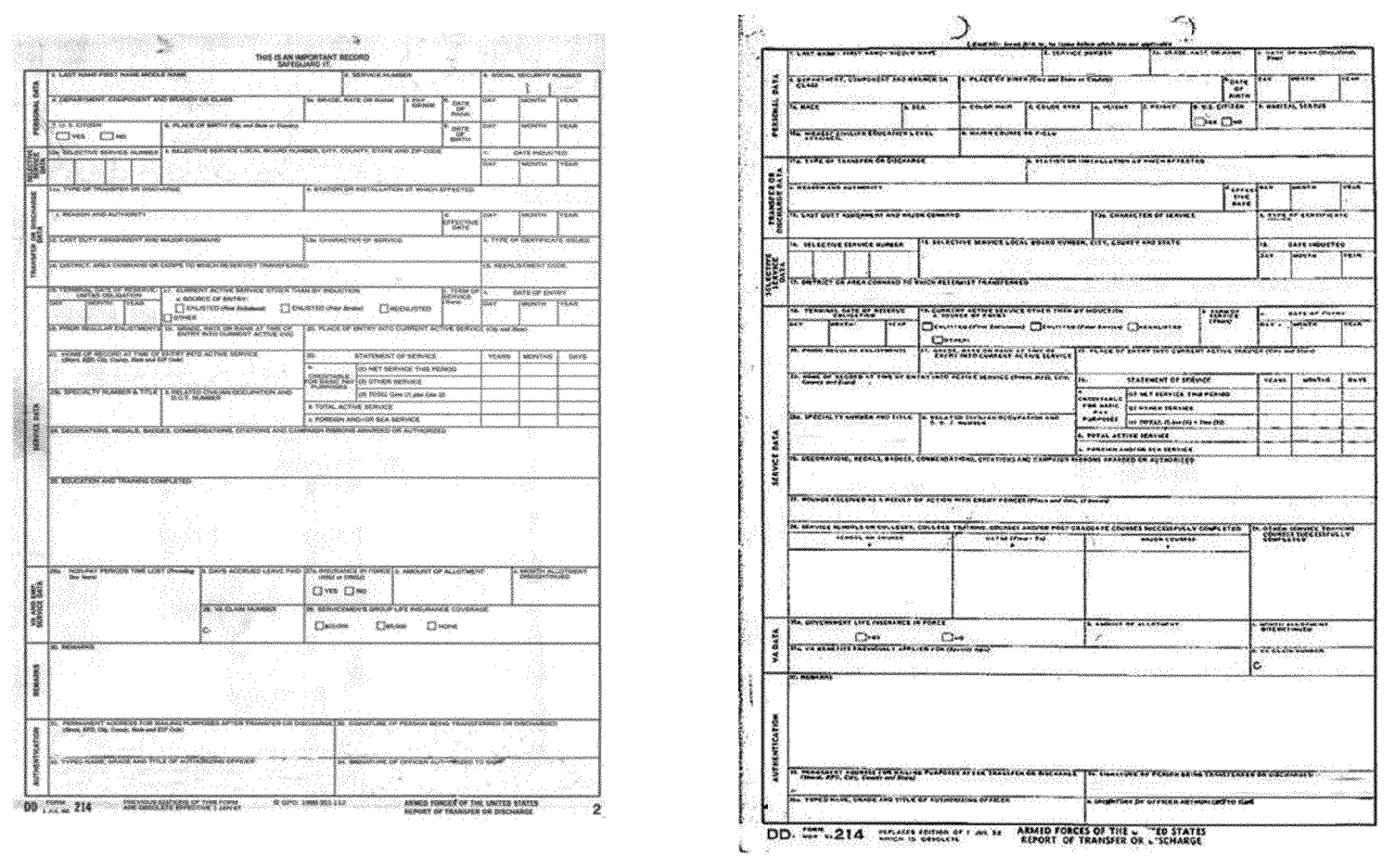
Figures 24G, 24H:
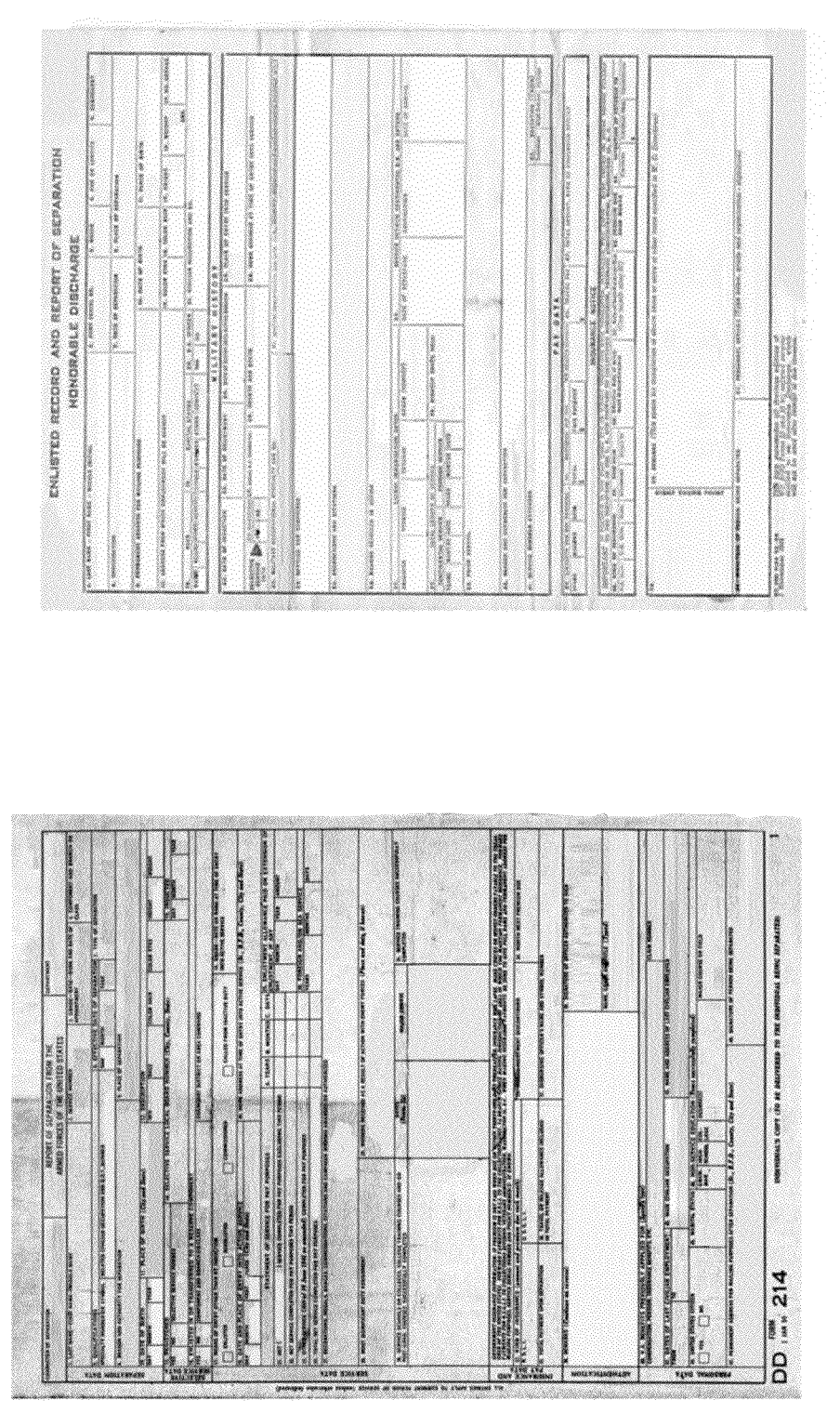

FIGS. 24A-24H are exemplary DD-214 forms that can be used with the present invention;

Figure 25B:
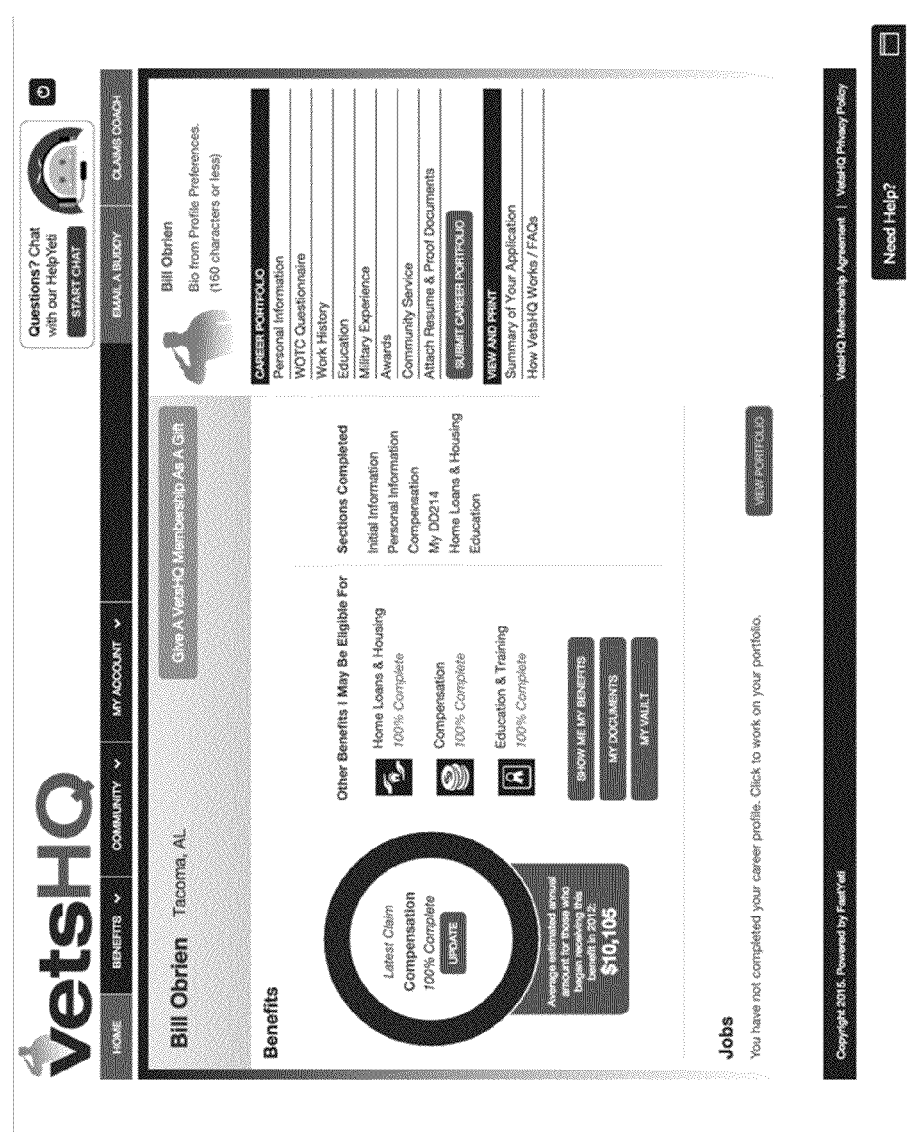

FIG. 25A is a screenshot of an exemplary logon screen in accordance with the present invention;

FIG. 25B is a screenshot of an exemplary home page screen in accordance with the present invention;

FIGS. 26A-26M are screenshots of exemplary screens for providing information for determination of eligibility for benefits in accordance with the present invention; and FIGS. 27A-27F are screenshots of exemplary screens for identifying benefit eligibility.

DETAILED DESCRIPTION

Exemplary embodiments of the invention will now be described in connection with the processing of a Department of Defense form 214, commonly referred to as a DD-214, to determine eligibility for various veterans benefits. It should be recognized that this is a particularly complex undertaking because the DD-214 has had a number of different versions since the forms were first issued in 1950, each version containing a different layout and/or different information. FIGS. 24A-24H illustrate forms used since the World War 2 era. The following table identifies the effective date of each of these forms:

| FIG. | Form Effective Date |
| --- | --- |
| 24A | August 2009 |
| 24B | February 2000 |
| 24C | November 1988 |
| 24D | November 1972 |
| 24E | July 1966 |
| 24F | November 1955 |
| 24G | January 1950 |
| 24H | 1950 and earlier (not identified as a DD-214) |

Further, there are currently 23,632 pages of Federal and Department of Veterans Affairs ("VA") rules and regulations related to benefits, 2,115 potential proof documents a veteran may be required to submit to the VA, and 173 potential forms that may need to be completed by a veteran.

Due to this complexity it is quite common for the award of benefits to take several years because veterans may not submit all of the required proof documents or complete the necessary forms. Further, the complexity often results in veterans not receiving all of the benefits to which they are entitled because the veteran either cannot properly understand the 23,632 pages of regulations and/or give up on the application process due to frustration with repeated rejections and/or requests for additional information.

Accordingly, exemplary embodiments of the present invention are directed to systems and methods that simplify the process of applying for veterans benefits. However, it should be recognized that the present invention is not limited to this particular application and instead the various inventive aspects disclosed herein can be employed in a variety of different environments.

Figure 1:
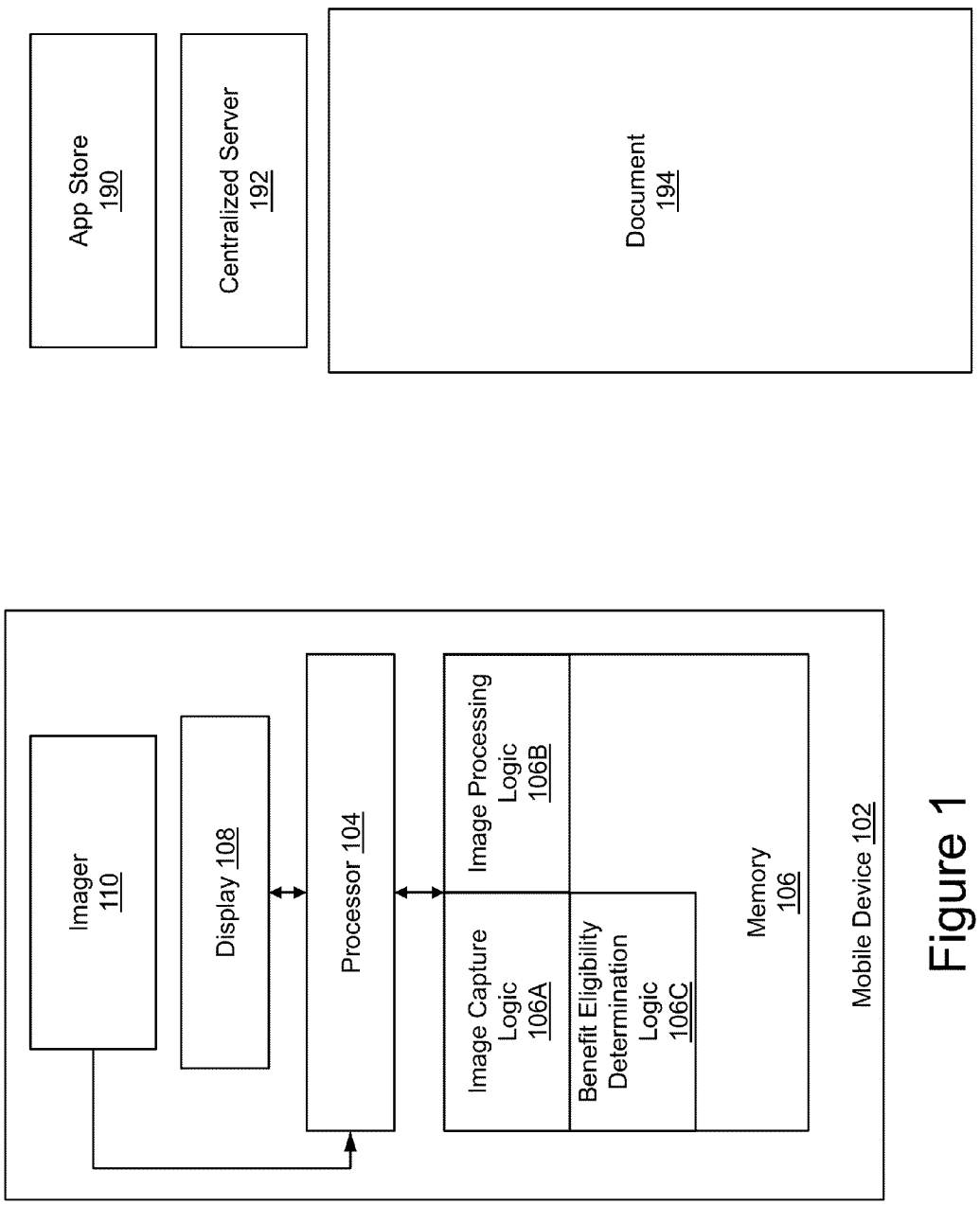
FIG. 1 is a block diagram of an exemplary system in accordance with the present invention.

FIG. 1 is a block diagram of an exemplary system in accordance with the present invention. The system includes a mobile device 102 that can obtain a document processing mobile application from app store 190. As part of the document processing, mobile device 102 can also communicate with a centralized server 192. Mobile device 102 includes a processor 104, which is coupled to a memory 106, display 108, and imager 110. Imager 110 is controlled by processor 104 to capture an image of a document 194.

Memory 106 includes logic 106A-106C, which is part of an application that is obtained from app store 190 and is executed by processor 104. Memory 106 can be any type of memory and can include both static and dynamic memory.

Processor 104 can be any type of processor, including a microprocessor, field programmable gate array (FPGA), or an application specific integrated circuit (ASIC). The logic 106A-106C of memory 106 can be stored as part of the execution of the logic by processor 104 and/or can be stored for future occasions on which the logic is executed by the processor 104 when a user of mobile device 102 selects the application for execution.

It should be recognized that FIG. 1 is a simple block diagram of a mobile device, which can include additional components to those illustrated in the figure. Specifically, mobile device 102 can include a communication processor and interface to communicate with app store 190 and/or centralized server 192. This can be achieved using any type of wired and/or wireless communication technique. Further, mobile device 102 can include additional user interface components, such as buttons, dials, switches, etc.

Although FIG. 1 illustrates app store 190 and centralized server 192 as separate entities, the functionalities of these entities can be combined into a single entity for mobile devices that do not require a dedicated app store, such as devices running Google's Android operating system.

Figure 2:
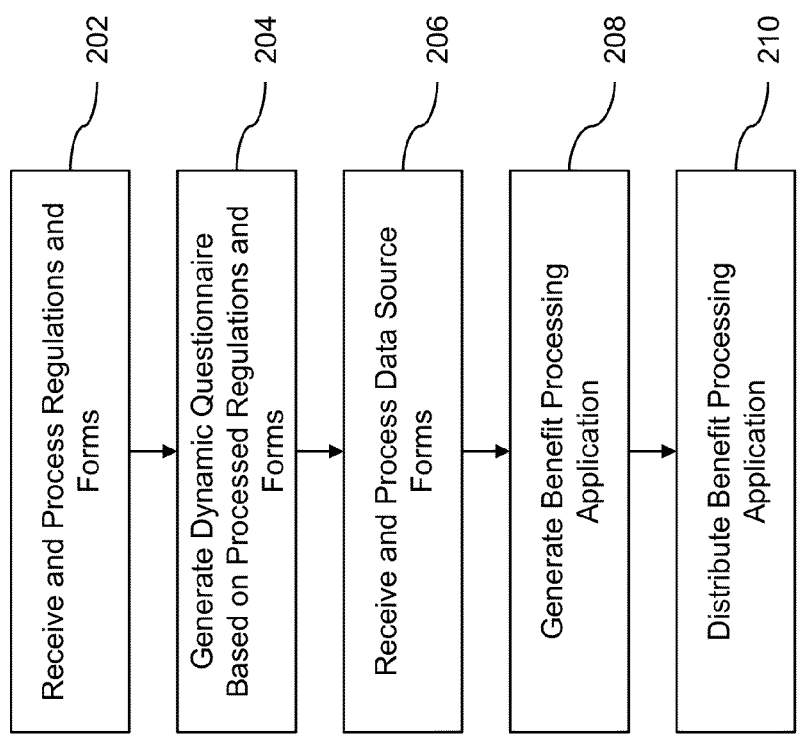
FIG. 2 is a flow diagram of an exemplary method for generating a document processing application in accordance with the present invention.

Now that an overview of the system of the present invention has been provided, a description of the operation of this system is presented in connection with FIGS. 2-23 and 25A-27F. FIG. 2 is a flow diagram of an exemplary method for generating a document processing application in accordance with the present invention. This processing is performed using app store 190 and centralized server 192. Initially, centralized sever 192 receives and processes the applicable regulations and submission forms (step 202). This involves identifying the rules specifically impacting the benefit eligibility determination and eliminating those rules that do not impact this determination. The remaining rules are then synthesized into a logical structure for determining benefit eligibility. For example, eligibility for a particular benefit may be defined by a number of different rules and/or sub-parts of a single rule. The requirements of these different rules are combined into a logical structure so that captured data can be compared to the logical structure to determine eligibility.

Next, centralized server 192 generates a dynamic questionnaire based on the processed regulations and forms (step 204). Centralized server 192 then receives and processes data source forms so that the layout and information content of the forms can be incorporated into the application (step 206). In the case of veterans benefits the data source forms will be the various versions of the DD-214. An application is generated using the processed regulations, submissions forms, and data source forms (step 208) and the application is distributed to an app store 190 and/or directly to one or more mobile devices 102 (step 210).

Figure 3A:
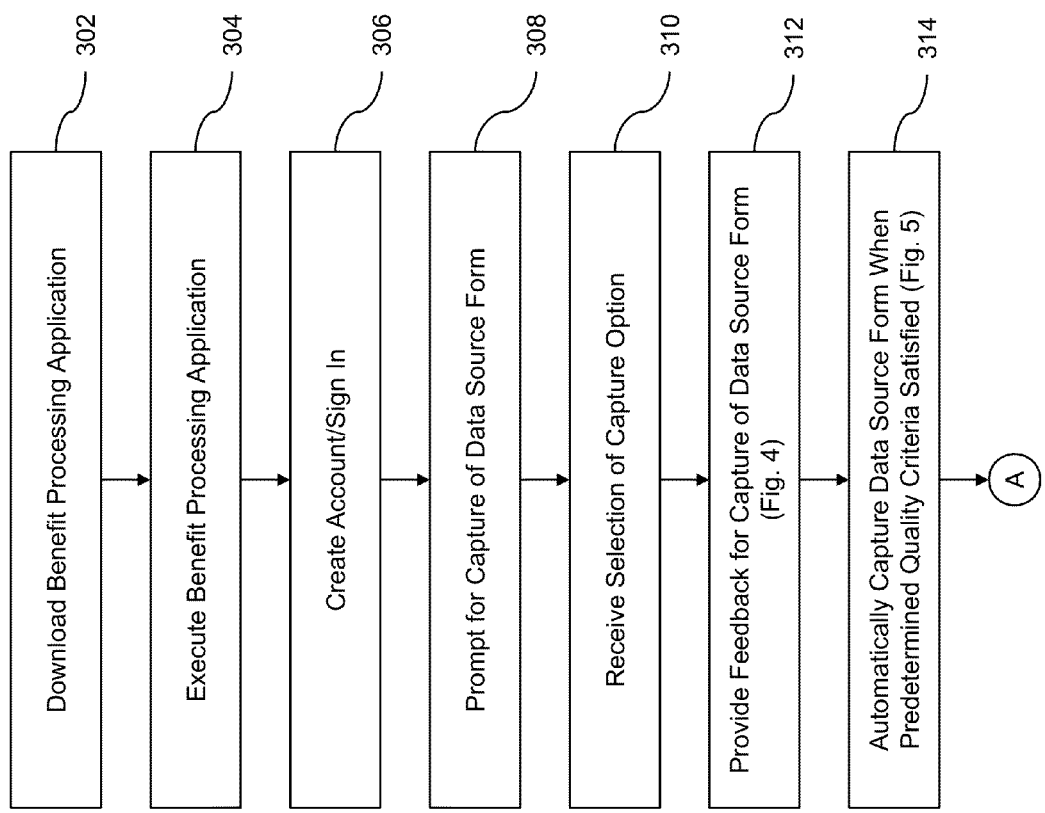
FIGS. 3A-3C are flow diagrams of an exemplary method for processing documents using an application in accordance with the present invention.
Figure 3B:
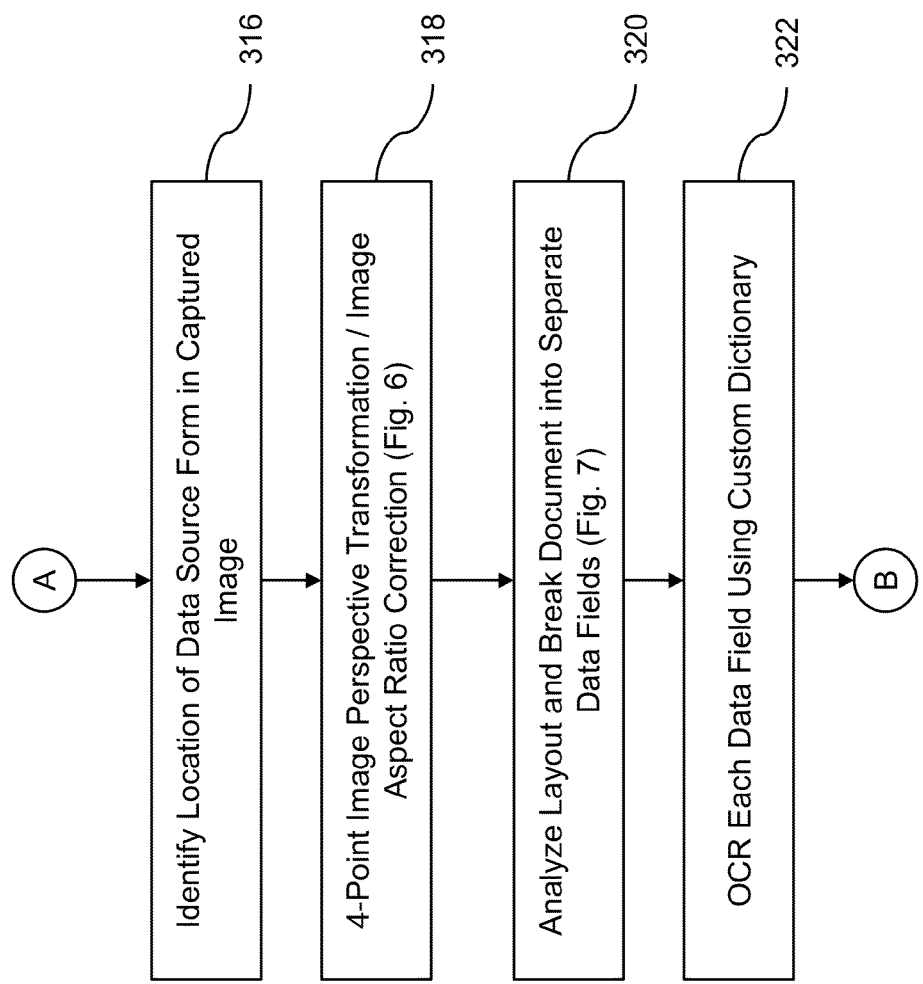
Figure 3C:
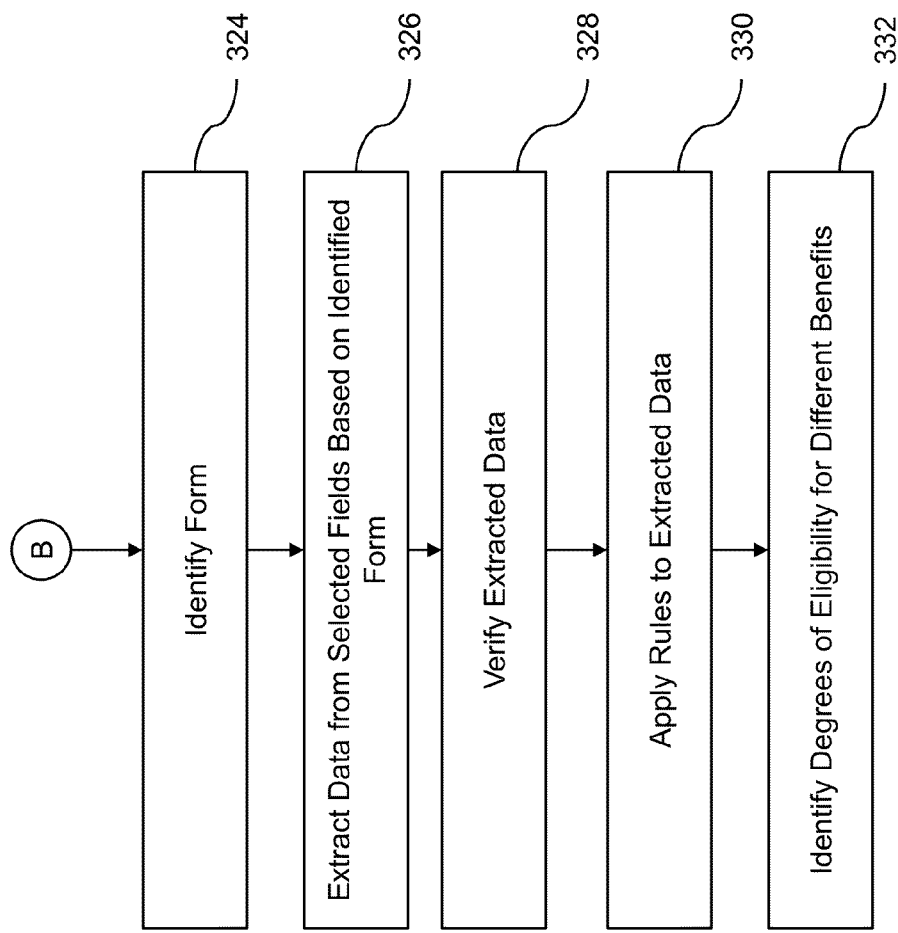

FIGS. 3A-3C are flow diagrams of an exemplary method for processing documents using an application in accordance with the present invention. Initially, mobile device 102 downloads the benefit processing application from app store 190 or centralized server 192 and stores it in memory 106 (step 302). Now that the benefit processing application has been stored in the mobile device 102, a user can execute the application using any type of input mechanism (step 304), and upon execution display 108 provides the display illustrated in FIG. 8.

Figure 9B:
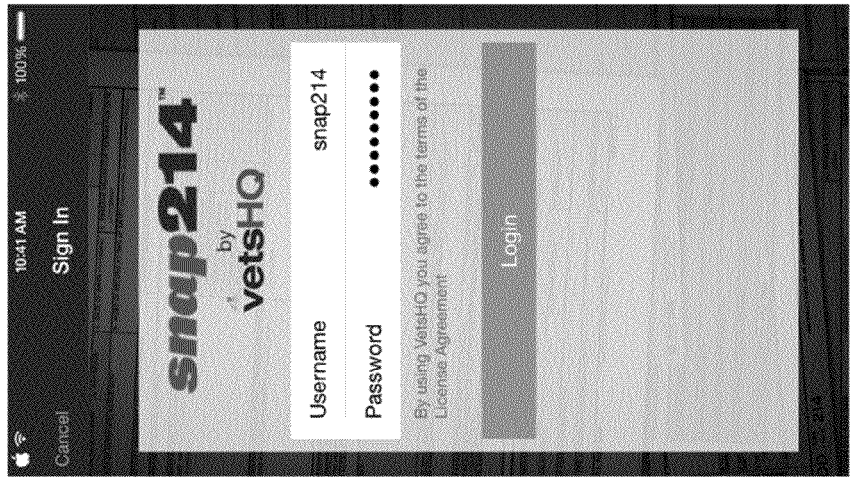
FIG. 9B is a screenshot of a sign-in screen in accordance with the present invention.
Figure 9A:
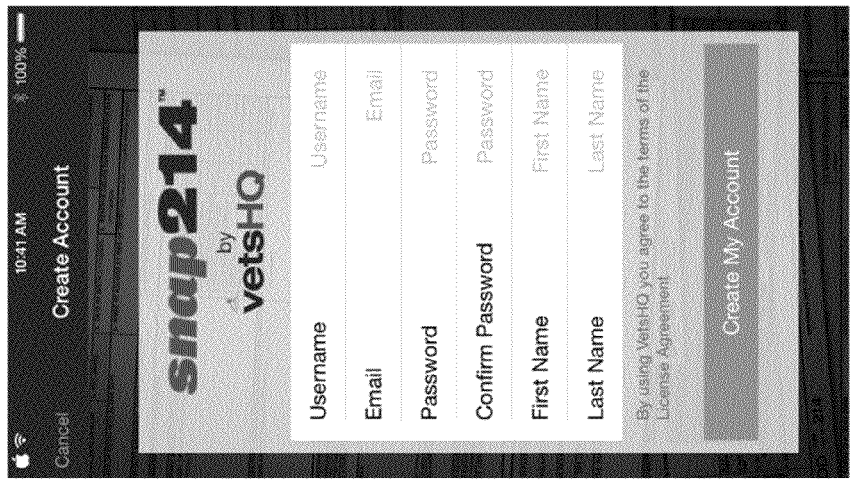
FIG. 9A is a screenshot of an exemplary account creation screen in accordance with the present invention.

Depending upon whether this is the first time the user is using the application, the user will either select create account 802 or sign in 804 (step 306). If the user elects to create an account, the screen illustrated in FIG. 9A is presented on display 108 and if the user elects to sign in then the screen illustrated FIG. 9B is presented on display 108.

Figure 10:
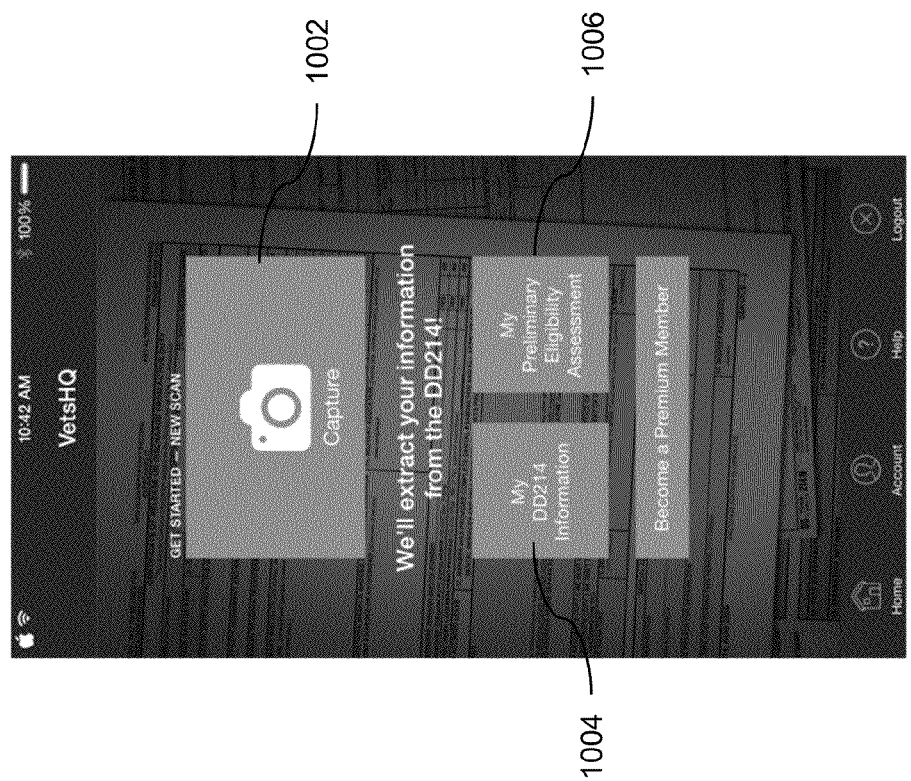
FIG. 10 is a screenshot of an exemplary getting started screen in accordance with the present invention.

Once the user has created an account or signed in (step 306), image capture logic 106A provides a prompt to the user on display 108 to capture a data source form, such as the DD-214, using imager 110 (step 308). An exemplary screenshot of a prompt is illustrated in FIG. 10 and if the user selects the "Capture" option 602 (step 310), then the data source form capture process is initiated. If the user has previously entered information and/or captured a DD-214 using the application the user can select the "My DD214 Information" option to enter additional information used for the benefit assessment, which will be described in more detail below in connection with FIGS. 18A and 18B. The user can also obtain a preliminary assessment of eligibility by selecting the "My Preliminary Eligibility Assessment" option 606, which will be described in more detail below in connection with FIGS. 19-23.

Exemplary embodiments of the present invention process the image in a particular manner so that it appears to the user that the image is being displayed in real-time. Because the device's camera captures video at high frame rates (24-240 frames per second), each frame contains 8 million pixels or more of data, and the computer vision algorithms discussed in detail below in connection with FIGS. 4A, 4B, 5, 6, and 7A-7C make several passes over the image data, it is not possible to process the information in real-time, even on modern hardware. To give the perception that the image is being processed in real-time, a number of optimizations are employed.

One optimization is to clone the raw image frames into smaller frames that are $1/n^{th}$ the size in each dimension, where n is a factor of 2 and a higher number on less powerful devices. The computer vision algorithms discussed in detail below in connection with FIGS. 4A, 4B, 5, 6, and 7A-7C process the smaller cloned frames in place of the originals and the results are scaled back up to match the size of the originals.

Because the user is attempting to hold the camera steady, movements of the document within the image displayed on the device should be slow. Accordingly, it is not necessary to process the image 60 times per second, which is usually the target to establish the illusion of real-time response to user input. The image processing algorithms discussed in detail below in connection with FIGS. 4A, 4B, 5, 6, and 7A-7C are only triggered for every $n^{th}$ frame received from the device's camera hardware, where n is a higher number on devices with faster camera hardware and also higher on devices with lower processing power.

To preserve user interface responsiveness and take advantage of the multicore hardware present in modern devices, the processing in the methods discussed in detail below in connection with FIGS. 4A, 4B, 5, 6, and 7A-7C is performed asynchronously in separate threads of execution from the main user interface. The number of threads of execution is calculated by 2*n where n is the number of logical processors available on the device.

Returning to FIG. 3A, in accordance with exemplary embodiments of the present invention image capture logic 106A provides feedback to the user to assist in the proper alignment of the form 194 with respect to the mobile device's imager 110 as part of the data source form capture process (step 312), the details of which will now be described in connection with FIGS. 4A and 4B.

Figure 4A:
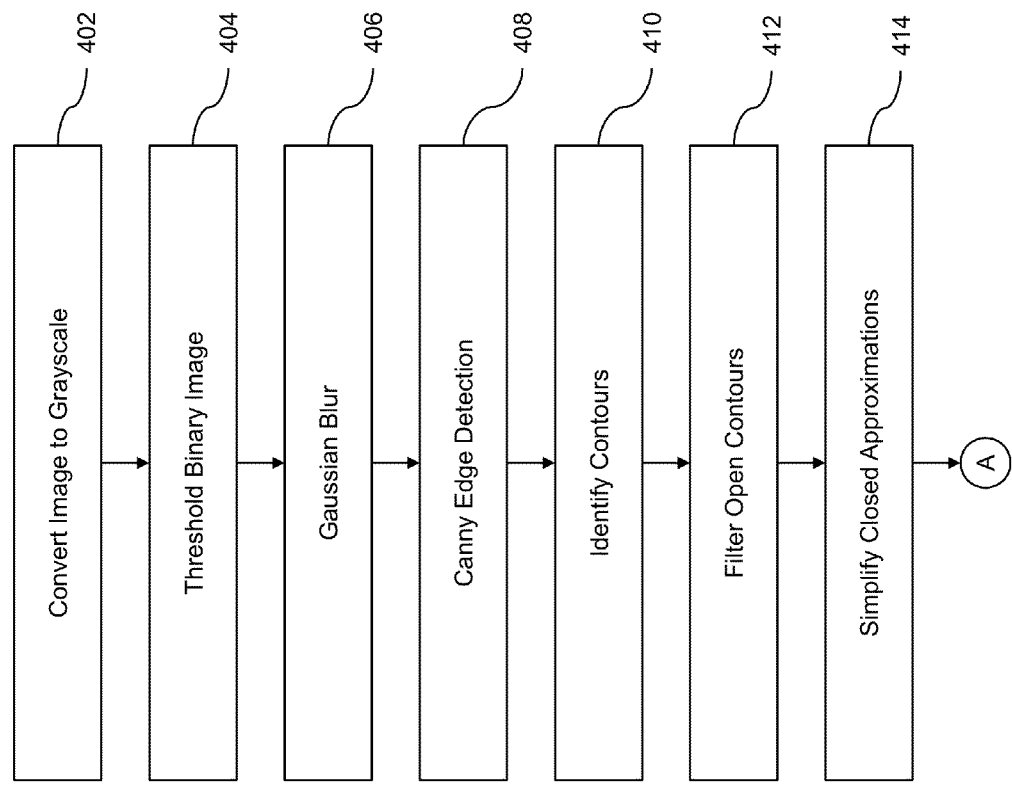
FIGS. 4A and 4B are flow diagrams of an exemplary method for providing feedback for capture of a data source form in accordance with the present invention.
Figure 4B:
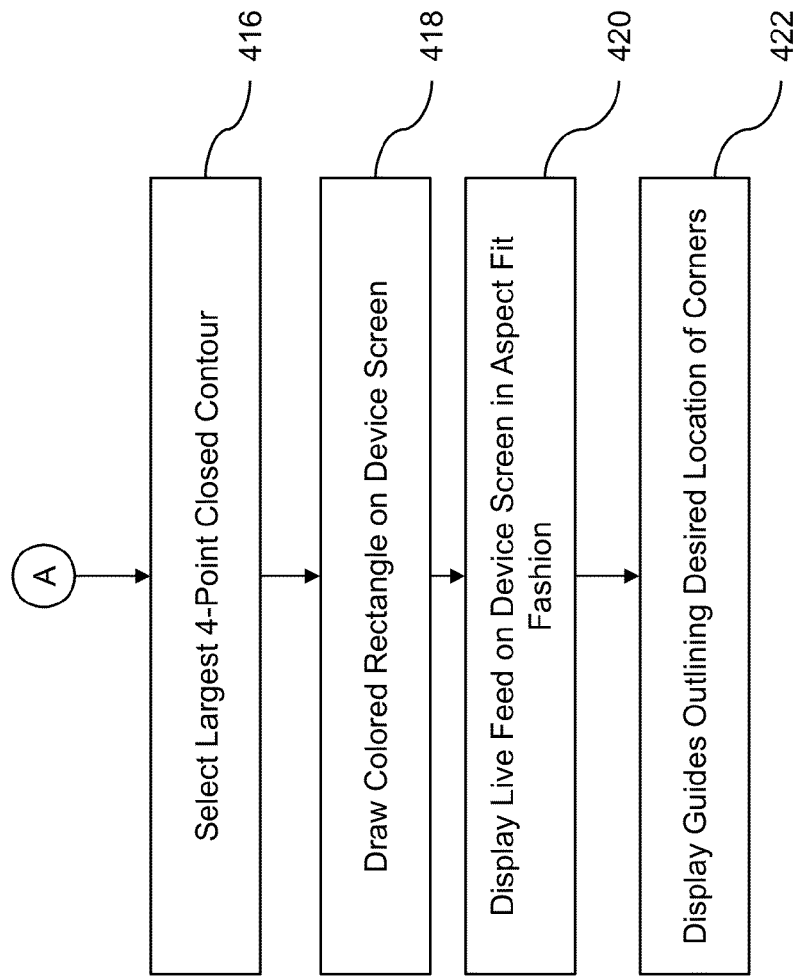
Figure 5:
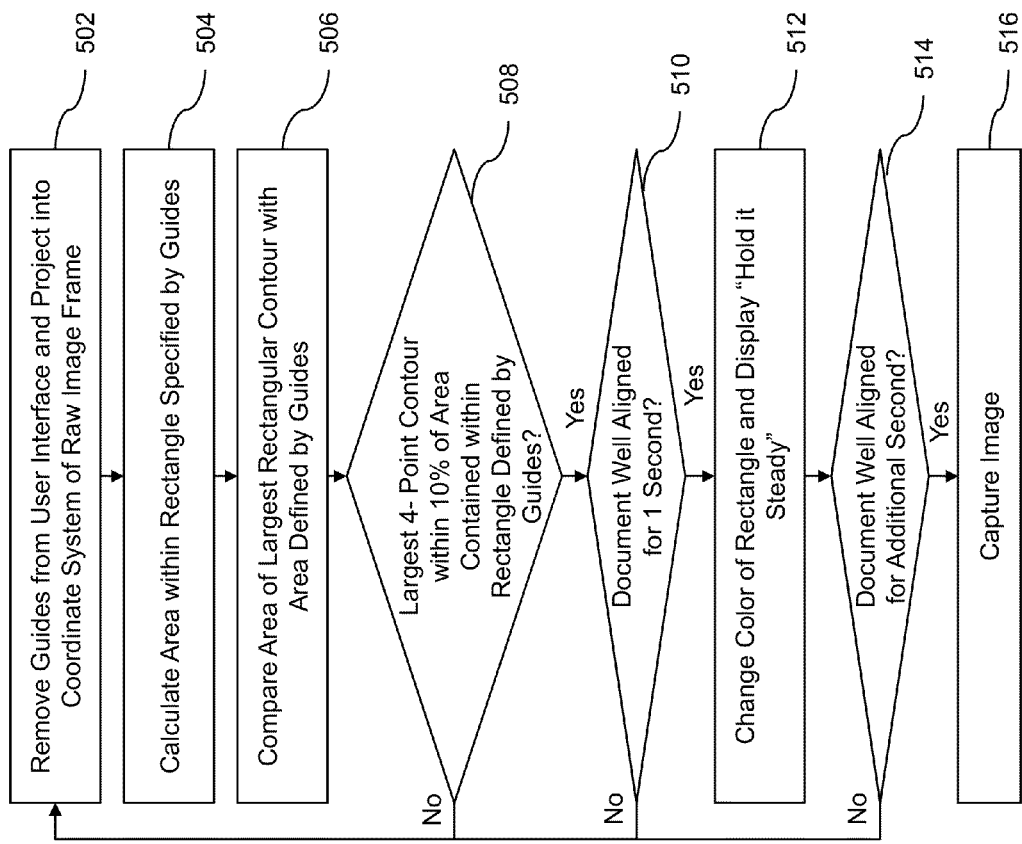
FIG. 5 is a flow diagram of an exemplary method for automatically capturing a data source form in accordance with the present invention.
Figure 6:
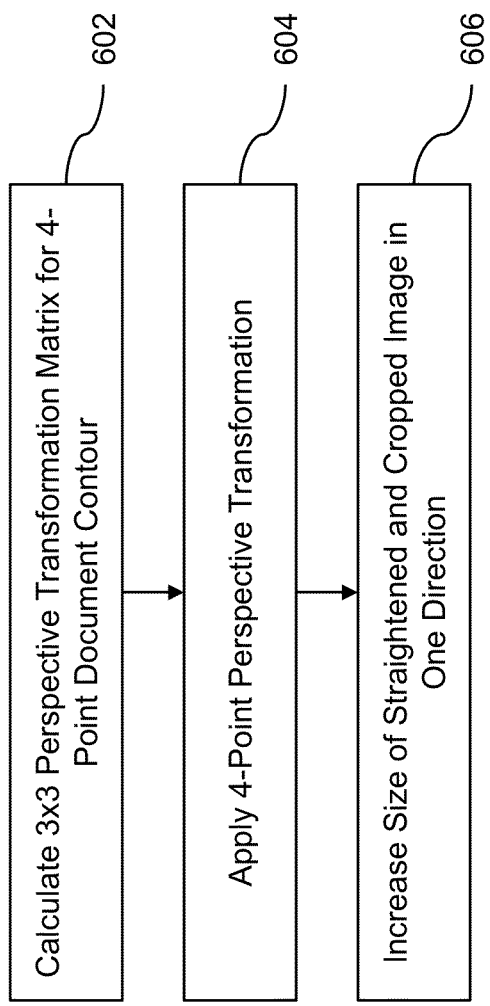
FIG. 6 is a flow diagram of an exemplary method for performing a perspective transformation and image aspect ratio correction in accordance with the present invention.

The method of FIGS. 4A and 4B are designed to identify the largest rectangular contour in a frame of image data because the largest contour is likely the document to be imaged. Initially, the image is converted to grayscale (step 402). The grayscale image is then thresholded to binary (each pixel is turned completely black or white) using adaptive mean method (step 404). This involves the use of an adaptive threshold value that is calculated by the mean average of a small neighborhood of pixels around the current pixel. The current pixel is turned black if it is below the threshold and white if it is at or above the threshold. It is important to use an adaptive algorithm at this point because the source image still contains the background around the edges of the document. Global thresholding algorithms would lose the edges of the document if the background behind the document is not nearly black.

Next, the image is subjected to a Gaussian blur using a small neighborhood (7×7) of pixels (step 406). The Gaussian blur reduces noise in the image (small random pixel variations) while preserving prominent features like the edge of the paper in the document on top of the background, which improves edge detection. A Canny edge detection algorithm is then performed to highlight all edges in the image (step 408).

Contours in the image are identified using a simple chain approximation (step 410) in which all contours are collapsed into a list of points (connect the dots style). Open contours whose beginning points do not connect with their end points are filtered out (step 412). The closed approximations are then simplified using the Douglas-Peucker path compression algorithm (step 414). This step filters out points that do not contribute much to the overall shape while retaining points that contribute a lot such as corners. Identifying the corners is important because the document to be detected should be as a large rectangle (4-point closed contour) even if the edges are not perfectly straight in the image.

Figure 15B:
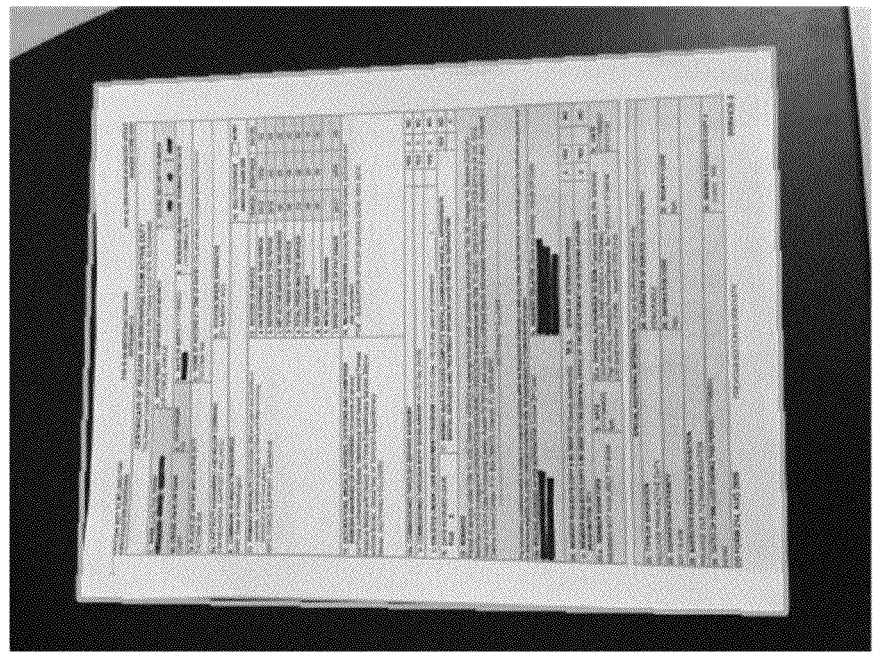
FIG. 15A illustrates an exemplary raw image after performing a Canny edge detection algorithm in accordance with the present invention.

Next, the largest (in terms of calculated area) 4-point contour is selected as the most likely candidate for the document in the image (step 416), an exemplary raw image resulting from this processing is illustrated in FIG. 15B. A colored rectangle (e.g., blue) approximating the 4-point contour of the document is drawn on top of the live feed in the user interface on the device's screen (step 418). The raw image in FIG. 15B is an image that is used to generate the image shown on the user interface but the image of FIG. 15B is not itself displayed to the user.

The image is now in proper form to place the live feed and corner guides in the user interface of the device. This involves automatically laying out the live preview and the guides while conforming to a set of constraints and dealing with device-to-device differences in screen and camera hardware pixel dimensions and aspect ratios. This process is then performed backwards in order to take the shape specified by the guides out of the coordinate system of the device's screen and place it into the coordinate system of the raw image frames. Specifically, a live feed from the camera hardware is displayed on the screen in an aspect fit fashion (step 420). The live feed is projected into the coordinate system of the device's screen and scaled as large as possible without cropping or any distortion. Guides outlining the desired locations of the corners of the document are then displayed on the screen in the foreground of the live feed (step 422). These guides are projected into the coordinate system of the device's screen and are drawn so that they match the aspect ratio of an 8.5×11 sheet of paper. The guides are aspect fit into the shape of the live feed view in such a way that a minimum of 10% of the width and height is left over on all sides of the guides. It is important to leave space on all sides so that the document is completely contained within the borders of the image at all times, even when the user's hand shakes. It is critical that the processing described above in connection with steps 402-416 is able to detect the whole rectangle of the document within the image.

Returning again to FIG. 3, once the feedback has been provided to the user and when the data from imager 110 satisfies predetermined quality criteria, the imager 110 automatically captures the form 194 (step 314). The details of the automatic capture process will now be described in detail in connection with FIG. 5. Specifically, the raw feed of pixel data from the imager 110 is processed to detect whether or not the document is well aligned with the guides so that the image can be automatically captured. Initially, the guides within the UI are taken out of the coordinate system of the device's screen and projected into the coordinate system of the raw image frame (step 502). The area contained within the rectangle specified by the guides in the coordinate system of the raw image frame is then calculated (step 504).

The area of the largest rectangular contour detected in the captured frame in step 416 is compared to the area defined by the guides in step 504 (step 506). The areas are compared first as a coarse first pass because it reduces the amount of processing. Once there is a sufficient match between these areas the positions are compared by calculating the area of the shape defined by the intersection between step 416 and step 504. Specifically, if the area of the largest rectangular contour detected in the captured frame in step 416 is not within 10% of the area defined by the guides in step 504 ("No" path out of decision step 508), then the sizes are too different for the document to be well aligned with the guides and processing returns to step 502. If, however, the area of the shape defined by the intersection between area of the largest rectangular contour detected in the captured frame in step 416 and the area defined by the guides in step 504 is within 10% of the area of the guides ("Yes" path out of decision step 508), then both the size and positions of the contour detected in the captured frame and the guides match well enough for the document to be well aligned within the guides. Steps 502-508 are repeatedly performed for subsequent frames.

Next it is determined whether the document remains well aligned for 1 full second, usually 24 to 60 subsequent frames depending on the device's camera hardware (step 510). If not ("No" path out of decision step 510), then processing returns to step 502. If so ("Yes" path out of decision step 510), then the guides and the rectangle approximating the borders of the document turn green and the user is shown a "hold it steady" message (step 512).

It is then determined whether the document remains well aligned for an additional second (step 514). If not ("No" path out of decision step 514), then processing returns to step 502. If so ("Yes" path out of decision step 514), then the device's camera hardware autofocus functionality is triggered around the coordinates of the document and an image is automatically captured (step 516). Because the document may have strayed out of alignment during the time it took to autofocus and take the picture, the same processing is applied on the captured image to ensure it is of sufficient quality for the subsequent processing described below. A further increase in quality can be obtained if the device supports High Dynamic Range (HDR) image capture.

FIGS. 11 and 12 illustrate exemplary screenshots produced by display 108 as part of the image capture processing. As illustrated in FIGS. 11 and 12, display 108 includes indications for the corners of the document by elements 1102A-1102D and 1202A-1202D. As can be seen by comparing FIGS. 11 and 12, when the document is not properly aligned display 108 reproduces the indicators 1102A-1102D as a different color then indicators 1202A-1202D. Indicators 1102A-1102D can be yellow or red, while indicators 1202A-1202D can be green. As also illustrated in FIG. 12, when image capture logic 106A initiates the automatic capture process display 108 notifies the user by prompt 1204 so that the relative position of the mobile device 102 and document 194 is maintained during the capture process. Further, a colored rectangle 1106, 1206 can be displayed to indicate the boundaries of the form being captured.

Figures 13, 14:
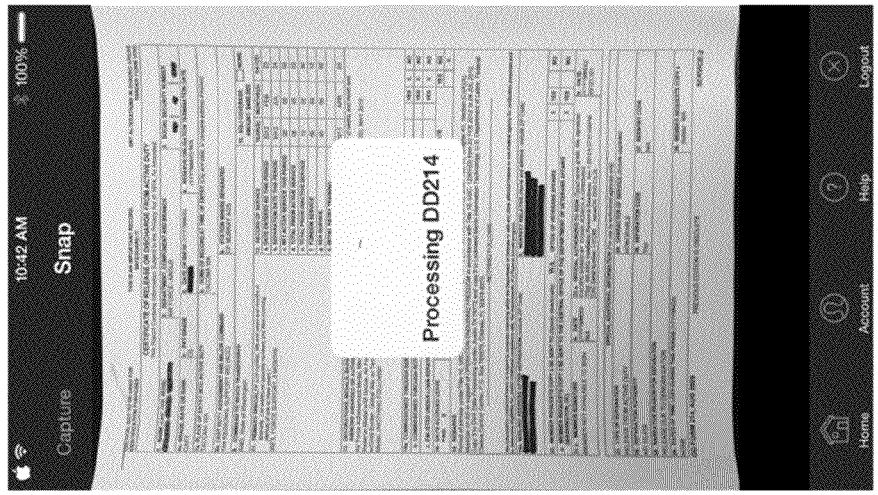
FIG. 13 is a screenshot of an exemplary captured document screen in accordance with the present invention.
FIG. 14 illustrates a captured document that has been subjected to 4-point transformation processing in accordance with the present invention.

After the data source form is captured (step 314), the image is processed by logic 106B, which will be described in connection with FIGS. 6, 7, and 14-17E. It should be recognized that FIGS. 14-17E are not presented to the user but instead are provided here to illustrate the image processing. Specifically, image processing logic 106B determines a location of the data source form in the captured image (step 316). FIG. 13 is a screenshot of a raw image captured by the imager 110. As can be seen, the raw image includes both the data source form, as well as the background. Accordingly, once image processing logic 106B identifies the location of the data source form in the image (step 316), image processing logic 106B performs a four-point image perspective transformation to deskew the data source form in the image and corrects an aspect ratio of the form in the captured image (step 318), which increases the accuracy of the subsequent optical character recognition process (OCR) described below. The details of this step will now be described in connection with FIG. 6 in which the image is cropped and the largest contour is perspective corrected. Initially, the 3×3 perspective transformation matrix is calculated for the 4-point document contour found in step 416 (step 602). Next, the 4-point perspective transformation is applied to the captured image resulting in a straightened image of the rectangular document with as much of the background image as possible cropped out (step 604). FIG. 14 illustrates a screen shot of the form after the four-point transformation. The four-point image perspective transformation realigns the form so that an orthogonal image of the form is obtained, similar to what would be produced had an image of the form been captured using a sheet-feed scanner.

Finally, the size of the straightened and cropped image is grown in one direction, either width or height, in order to match the aspect ratio of an 8.5×11 piece of paper (step 606). The image data is interpolated into the new size correcting any distortion in the image. The resulting image is as close as possible to the sort of image one would obtain if the document had been scanned using a dedicated scanner instead of being captured using a mobile device's imager.

Because the present invention operates using known forms having defined formats, the present invention can correct the aspect ratio to match that of expected document. In contrast, general scanning algorithms using mobile device images typically do not have any advanced information about the size of the imaged document. If it is assumed that the form is printed on a regular piece of paper that is 8.5×11 inches, the aspect ratio would be 8.5/11=0.7727. If the aspect ratio of the form in the image is less than 0.7727, then the width of the imaged form is increased and if the aspect ratio is greater the height is increased. Increasing one of the dimensions to achieve the proper aspect ratio preserves as much of the original detail as possible.

Figure 7A:
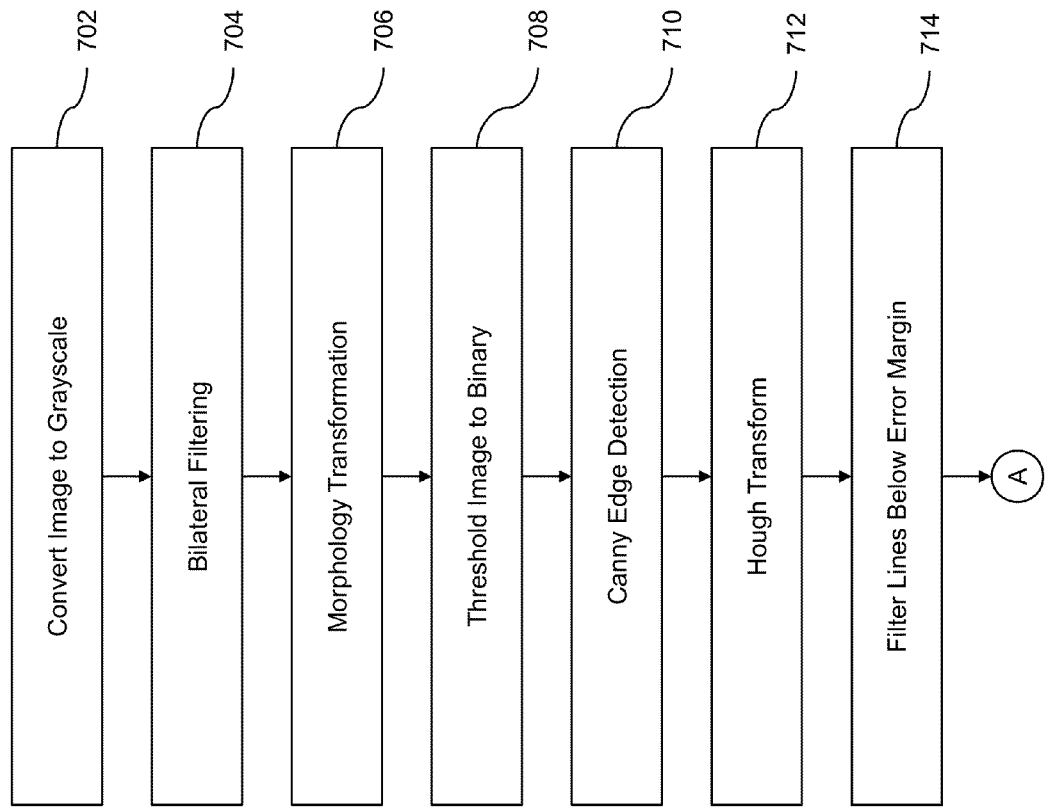
FIGS. 7A-7C are a flow diagrams of an exemplary method for processing an image to extract data from selected fields in accordance with the present invention.
Figure 7B:
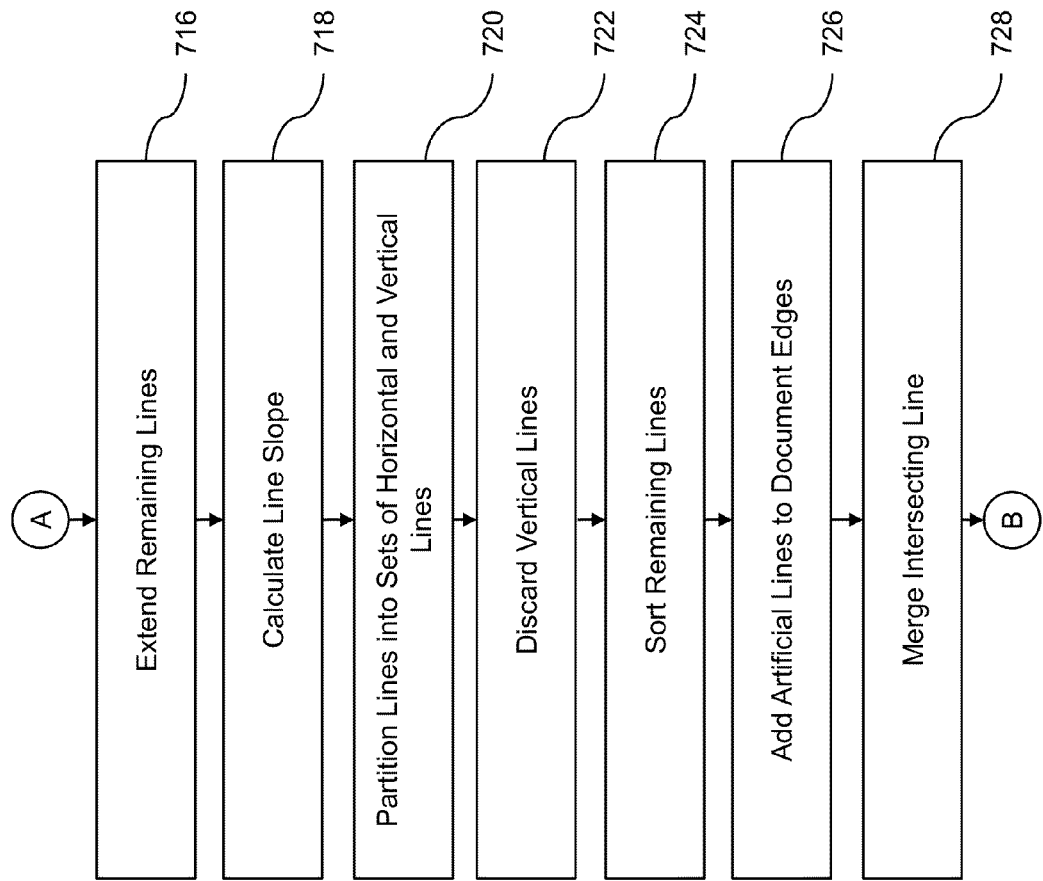
Figure 7C:
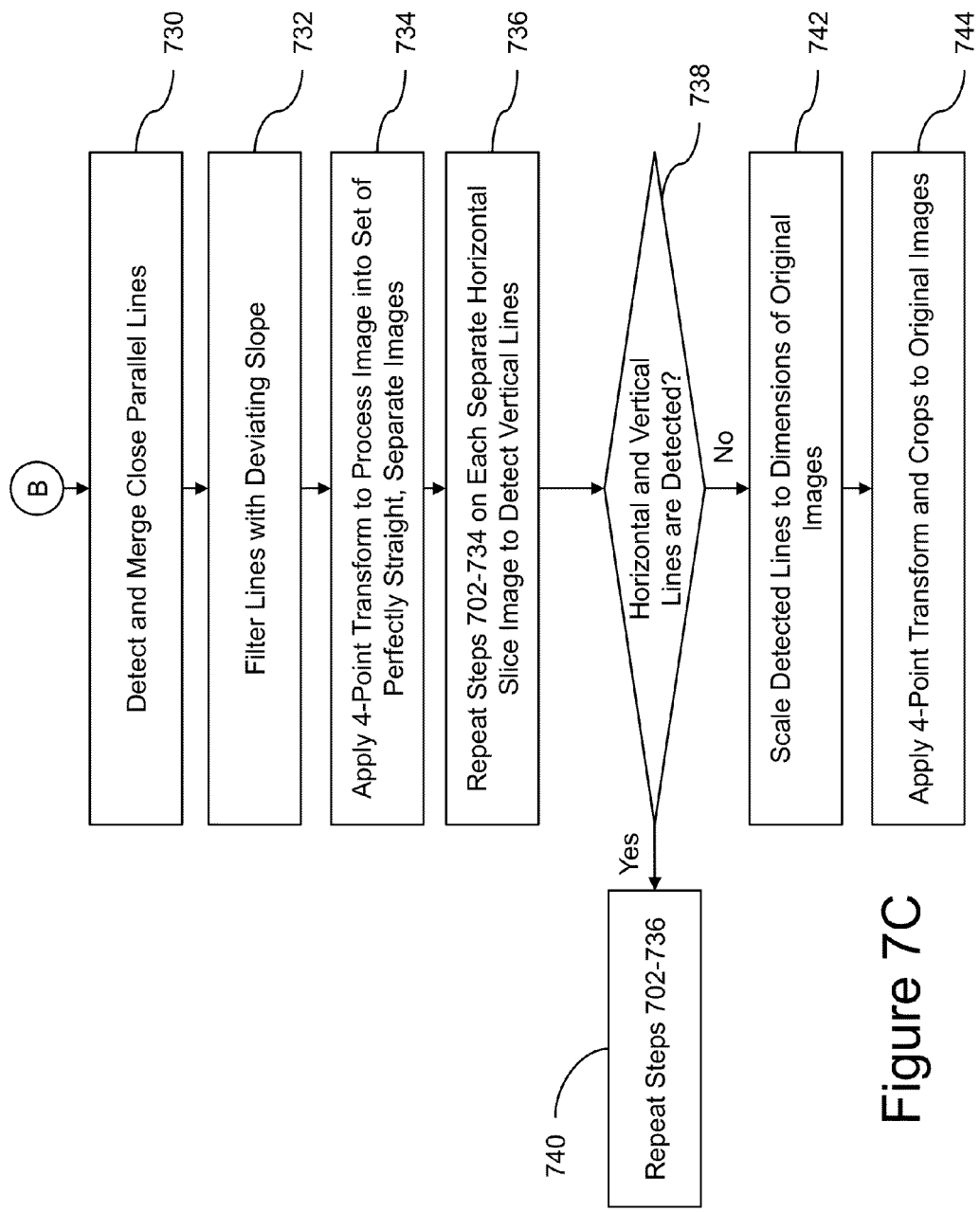
Figure 8:
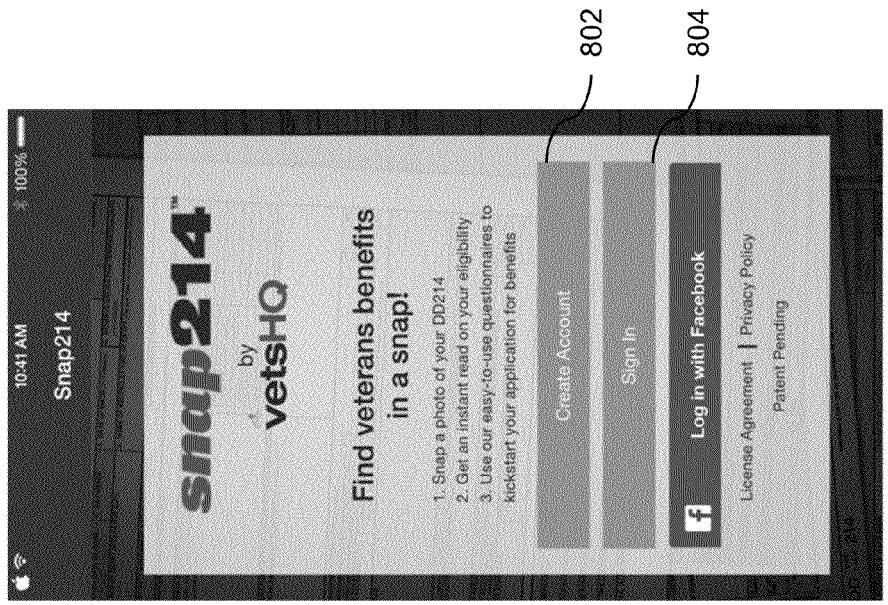
FIG. 8 is a screenshot of an exemplary start-up screen in accordance with the present invention.

Image processing logic 106B then analyzes the layout of the document and breaks the document into separate data fields (step 320), the details of which will now be described in connection with FIGS. 7A-7C. This processing parses the nested table structure of the document in the image into many smaller images of each individual field.

Initially, the image is converted to grayscale (step 702). Next bilateral filtering is performed on the image to reduce noise while preserving lines (step 704). The lines at this stage of the processing are much more important so the more computationally expensive bilateral filter is chosen over the Gaussian blur as a means to reduce noise while preserving edges.

A morphology transformation is performed to "close" any small gaps in the lines due to fading or low toner issues, which is very common with older documents (step 706). The "close" is achieved by performing a dilation followed by erosion. The resulting inked areas of the image should be the overall same shape with any small gaps removed. The image is then thresholded to binary using an Otsu algorithm (step 708). It is no longer necessary, or desirable to use adaptive thresholding at this point because the background should be mostly cropped out of the image. The pixels should either be mostly white (the paper) or mostly black (the borders and text).

Figure 15A:
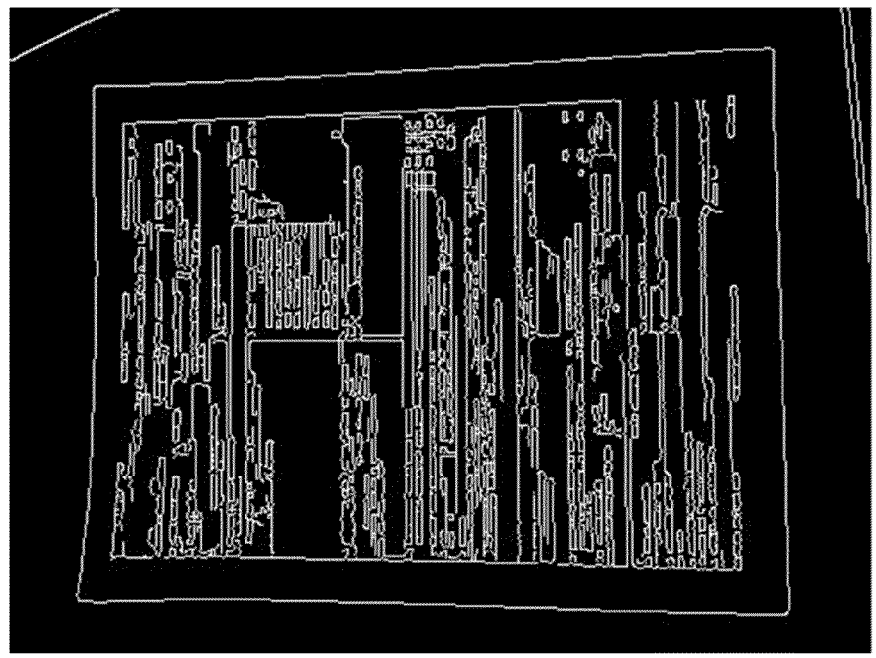

A Canny edge detection algorithm is applied to highlight the edges in the document (step 710), and then a Hough transform is applied to detect lines in the binary image of the document (step 712). FIG. 15A illustrates the raw image after applying the Canny edge detection algorithm.

Lines below a certain error margin of the expected horizontal line width (for first pass: width of paper minus margins) are filtered out (step 714). Each detected line is then extended so that the lines' beginning and ending point are on the edges of the image (step 716). Next, the slope of each returned line is calculated (step 718) and the detected lines are partitioned into sets of horizontal (slope<1 and slope>−1) and vertical lines (step 720). The vertical lines are discarded (step 722) and the remaining lines are sorted based on the y-value of their starting point (step 724).

Artificial lines are then added along the edges of the document (step 726) and intersecting lines are merged by interpolating the beginning and ending points (step 728).

Lines that are parallel (very similar slope) and very close to each other (distance between start points is small) are detected and merged together by interpolating their start and end points (step 730). This is an important step because frequently the Hough transform will detect lines at the top and bottom of the same line in the document. Merging the two lines will generate a line that perfectly tracks the line in the document. All lines in the document are expected to be perfectly vertical or horizontal, and accordingly any lines with a slope greater than 0.02 are filtered out (step 732). FIG. 16 illustrates an image with the lines remaining after the processing in steps 714-732. As will be appreciated, the lines in FIG. 16 match very well with the horizontal boarders in the image of the document. It should be appreciated that FIG. 16 illustrates an image subjected to the processing and is not displayed to the user.

Figures 17A, 17B, 17C, 17D, 17E:
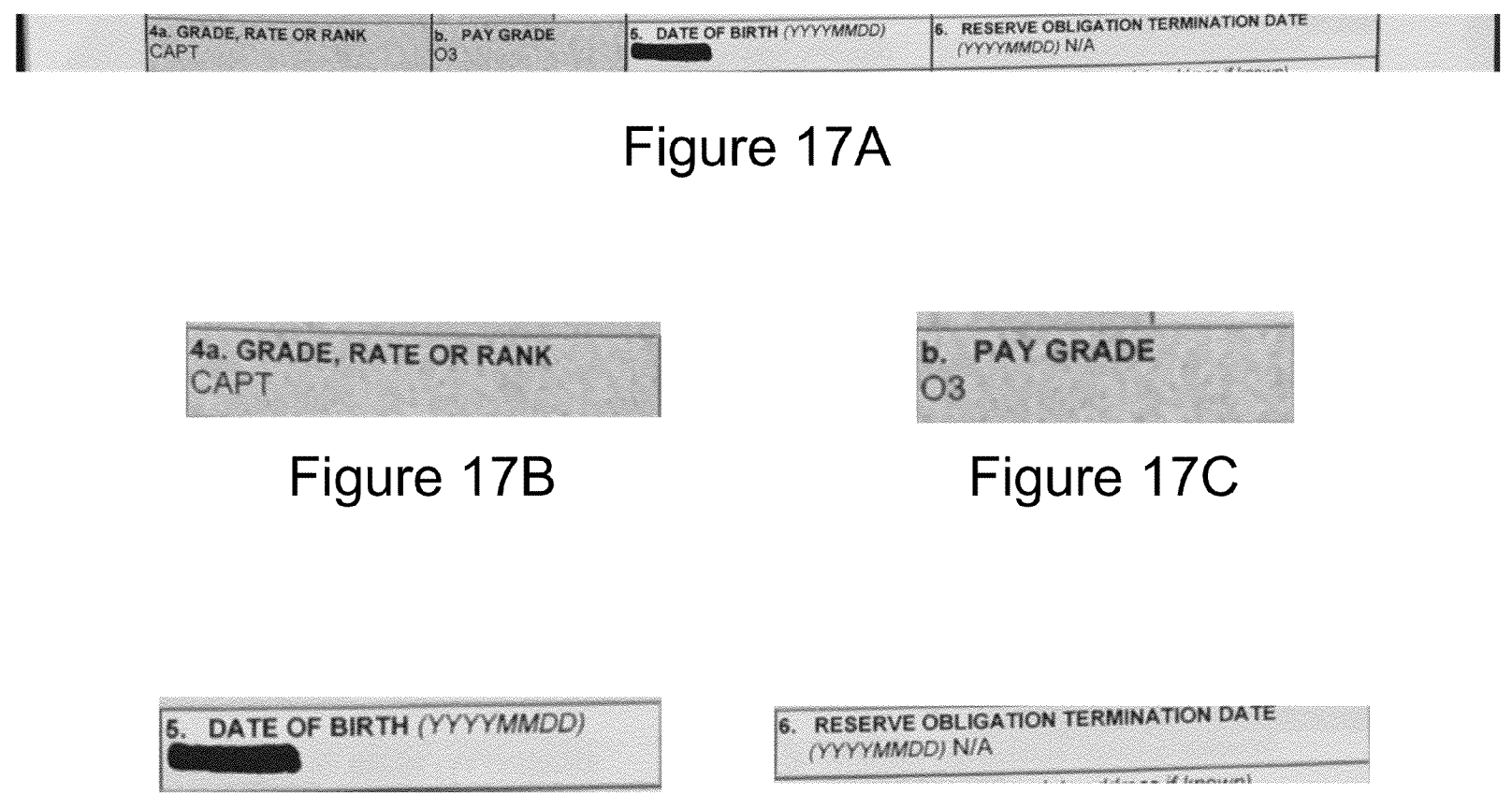

Each neighboring pair of lines defines a slice of the document. The beginning and ending points of each pair of lines are used to create a 4-point perspective transform. The image is then processed into a set of perfectly straight, separate images by applying each 4-point transform (step 734). FIG. 17A illustrates one of the individual images of a row from the form that results from the processing of step 734.

Steps 702-734 are then applied similarly to each of the separate horizontal slice images to detect vertical lines (step 736). When step 722 is repeated horizontal lines are discarded instead of vertical lines, and thus the image of FIG. 17A is broken into the individual images of FIGS. 17B-17E. Once steps 702-734 are repeated, it is then determined whether any additional horizontal and vertical lines are detected (step 738). If so ("Yes" path out of decision step 738) then steps 702-736 are repeated (step 740). If not ("No" path out of decision step 738), then the detected lines are scaled up to the dimensions of the original images (step 742) and 4-point transform/crops are actually applied to the original images (step 744). These last two steps are performed because the line detection process described is applied to images that are $1/n^{th}$ the size in each dimension, where n is a factor of 2 and a higher number on less powerful devices.

Returning again to FIG. 3C, image processing logic 106B then subjects the separated data fields to optical character recognition (OCR) processing using a custom dictionary (step 322).

Because exemplary embodiments of the present invention involve the use of a known form, including variations and revisions to the form, the custom dictionary can include only those words known to appear on the form. Here, it should be recognized that the term "words" is being used in an expansive sense because the form can include not only proper words but also acronyms. Using the custom dictionary with a limited word set increases the accuracy of the OCR processing because there will be less opportunity to misinterpreted as word as another word that would not actually appear on the form. Separating the fields prior to OCR processing also increases accuracy and reduces overall processing time because unrelated fields, non-text elements, and most of the borders are removed and therefore do not need to be processed.

After performing the OCR processing image processing logic 106B identifies the form (step 324) so that it can be determined where in the form data should be extracted as well as which data is to be extracted. Specifically, data can be located in different places in different versions of the form and some versions of the form may include certain types of data that are not included in other versions. By identifying the form the location and type of data that can be employed for benefit determination can be quickly and easily determined. Accordingly, based on the identified form image processing logic 106B extracts data from selected fields (step 326) and verifies the extracted data (step 328).

The verification can also involve the user manually verifying some or all of the data. FIGS. 18A and 18B illustrate screenshots of exemplary data verification screens in accordance with the present invention. FIG. 18A illustrates that some of the data can be verified/corrected using a structured list of input options and FIG. 18B illustrates that some of the data can be verified/corrected using free text input.

Once verified, logic 106C applies the eligibility rules to the extracted data (step 330) and identifies degrees of eligibility for different benefits on the display 108 (step 332).

FIGS. 19-22C are exemplary screenshots of benefit eligibility screens that can be accessed when a user selects the "My Preliminary Eligibility Assessment" option 606 from the screen illustrated in FIG. 10. As illustrated in FIG. 19, the user is presented with three categories of benefits: compensation, education, and housing, as well as a preliminary indication of eligibility (i.e., the user is likely eligible for compensation and is an excellent match for education and housing benefits).

When the user selects the "Compensation" option from the screen in FIG. 19, the user is presented with the screen of FIG. 20A indicating a range of potential compensation benefits. When the user selects the "Benefits Programs" option in with the screen of FIG. 20A the user is presented with the screen of FIG. 20B describing different compensation benefit programs and when the user selects the "Life Events" option in screen with the screen of FIG. 20A or 20B the user is presented with the screen of FIG. 20C describing various life events that affect a compensation benefit. It should be recognized that any of the three options in FIGS. 20A-20C can be accessed from any of the illustrated screens.

When the user selects the "Education" option from the screen in FIG. 19, the user is presented with the screen of FIG. 21A indicating a range of potential compensation benefits for education. When the user selects the "Benefits Programs" option in with the screen of FIG. 21B the user is presented with the screen of FIG. 16B describing different education benefit programs and when the user selects the "Life Events" option in with the screen of FIG. 21A or 21B the user is presented with the screen of FIG. 21C describing various life events that affect an education benefit. It should be recognized that any of the three options in FIGS. 20A-20C can be accessed from any of the illustrated screens.

When the user selects the "Housing" option from the screen in FIG. 19, the user is presented with the screen of FIG. 22A indicating a range of potential compensation benefits for housing. When the user selects the "Benefits Programs" option in with the screen of FIG. 22B the user is presented with the screen of FIG. 22B describing different education benefit programs and when the user selects the "Life Events" option in with the screen of FIG. 22A or 22B the user is presented with the screen of FIG. 22C describing various life events that affect an education benefit. It should be recognized that any of the three options in FIGS. 22A-22C can be accessed from any of the illustrated screens.

Mobile device 102 can then transmit the processed data to centralized server 192 so that the actual benefit application processes can be initiated. FIG. 23 is an exemplary submission verification screen, which also provides an explanation of the data security features of the system. Of course, the application processes can be performed on the mobile device 102, if desired.

Although exemplary embodiments have been described in connection with a mobile application, exemplary embodiments also provide for benefit assessment using a web browser, which will now be described in connection with FIGS. 25A-27F. It should be recognized that the mobile application and web browser techniques are not exclusive but instead can be complementary. Thus, part of the process can be completed using the mobile application while other parts can be completed using the web browser. The web browser can be running on any type of device, including, but not limited to, a desktop computer, laptop computer, tablet, smartphone, etc.

FIG. 25A is a screenshot of an exemplary logon screen in accordance with the present invention. If the user has a pre-existing account they can log-in using those credentials, which can be the same as those used with the mobile application. The user can also sign-up for a new account. Further, third-party credentials can be used in place of site-specific credentials, which in the screen of FIG. 25A include Facebook credentials. It should be recognized that other websites allow this use of their logon credentials, such as Yahoo and Google, and the present invention can also be employed using those credentials. When third party credentials are employed, these are used only as logon credentials and the user will still have to create a new account. However, some of the user's information could, if available from the third party, be automatically inserted into the new account, such as mailing address, e-mail address, telephone number(s), etc.

Once the user's credentials are verified the user is presented with a home page screen, such as the one illustrated in FIG. 25B. The screen illustrated in FIG. 25B is for a user that has already provided the information necessary for the benefit eligibility determination. Thus, as illustrated in the middle of the screen the user has provided enough information so that the "Home Loans & Housing", "Compensation", and "Education & Training" benefits can be determined, which is reflected in the indication that these categories are "100% Complete". As also illustrated in the middle of the screen the user has completed the sections for "Initial Information", "Personal Information", "Compensation", "My DD214", "Home Loans & Housing", and "Education". As illustrated in the "Jobs" section on the bottom of the screen the user has not completed his/her career profile and can click on that area to provide the necessary information.

The right-hand side of the screen provides hyperlinks to various pieces of information in the Career Portfolio and the ability to view and print the benefit application(s). The top of the screen provides access to other parts of the website, including to "Benefits", "Community", and "My Account".

Figure 26A:
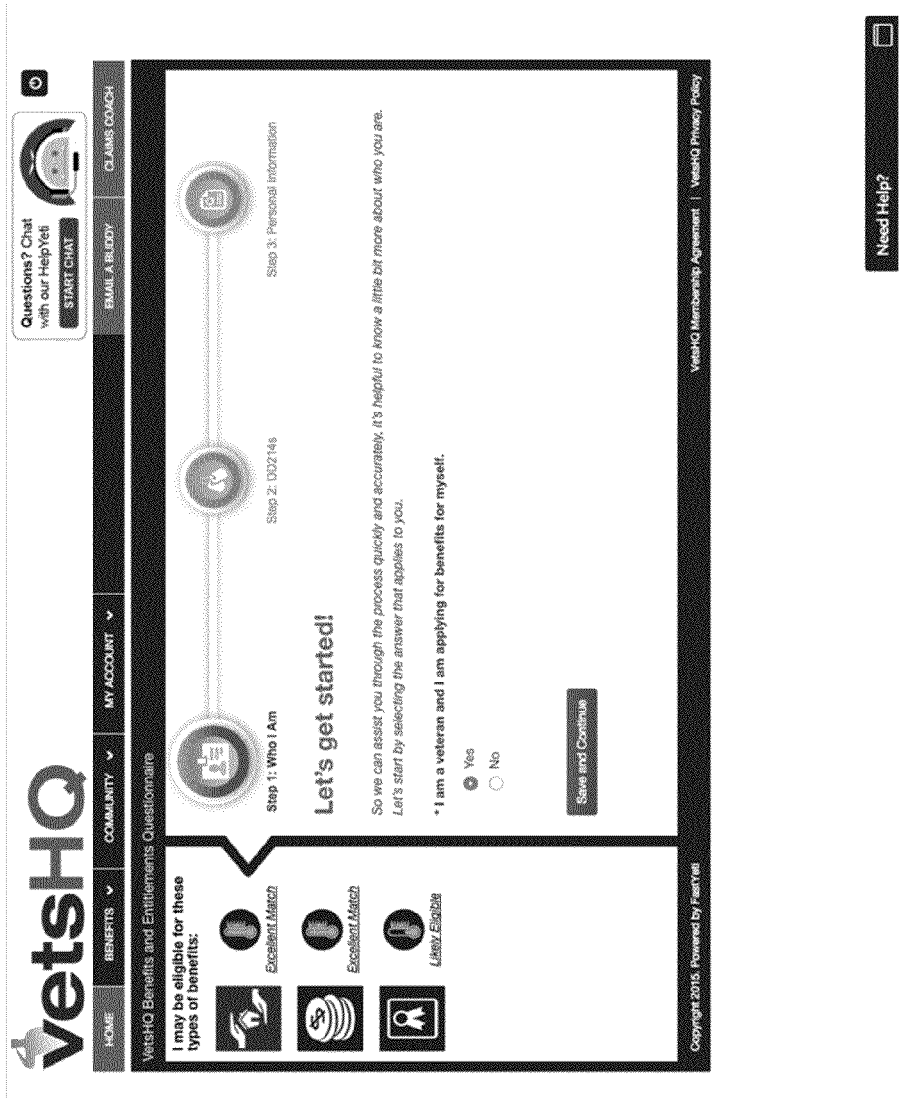

FIGS. 26A-26M are screenshots of exemplary screens for providing information for determination of eligibility for benefits in accordance with the present invention. FIG. 26A illustrates the initial data input screen where the user indicates whether they are applying for benefits for themselves or whether they are completing the application on behalf of a veteran.

Figure 26B:
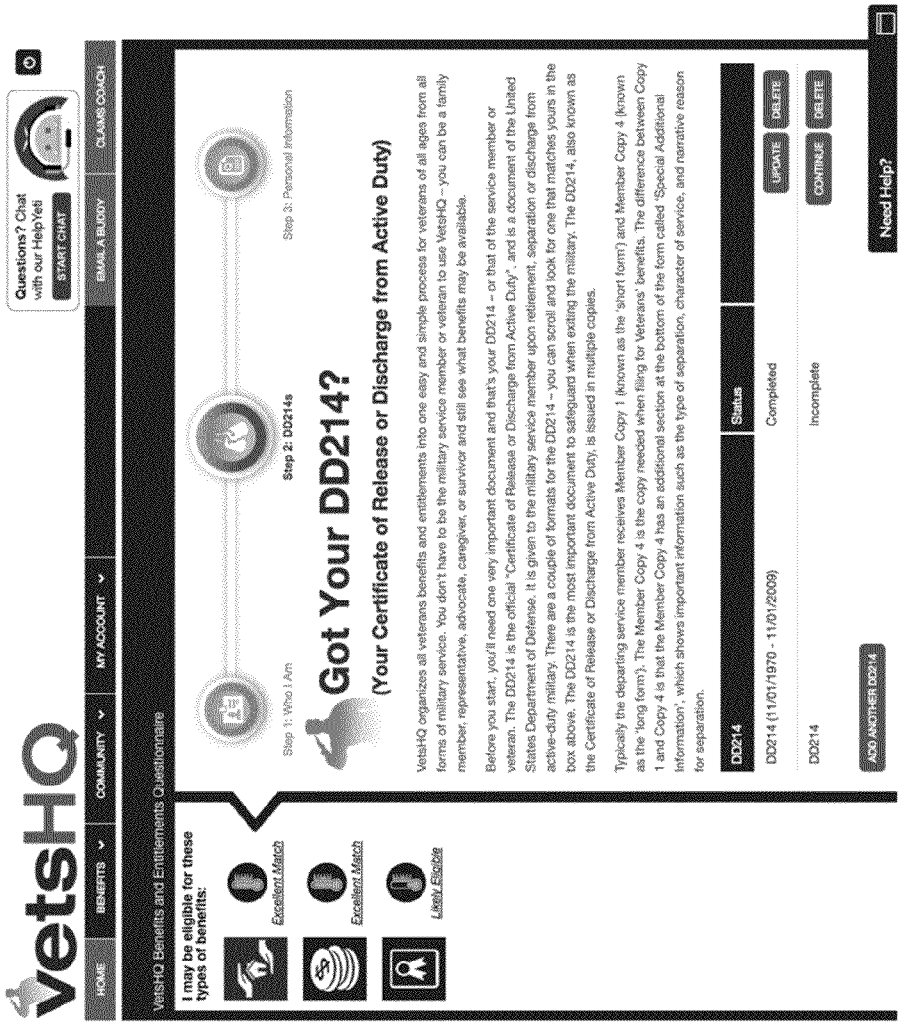
Figure 26C:
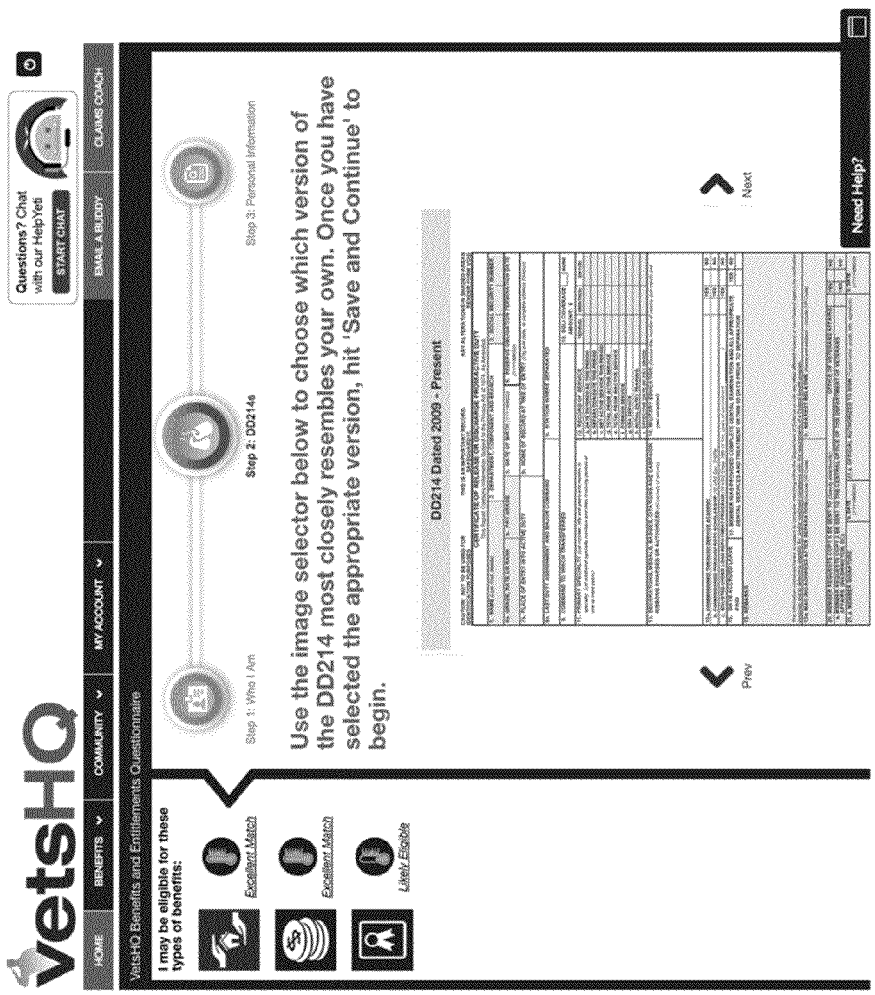
Figure 26D:
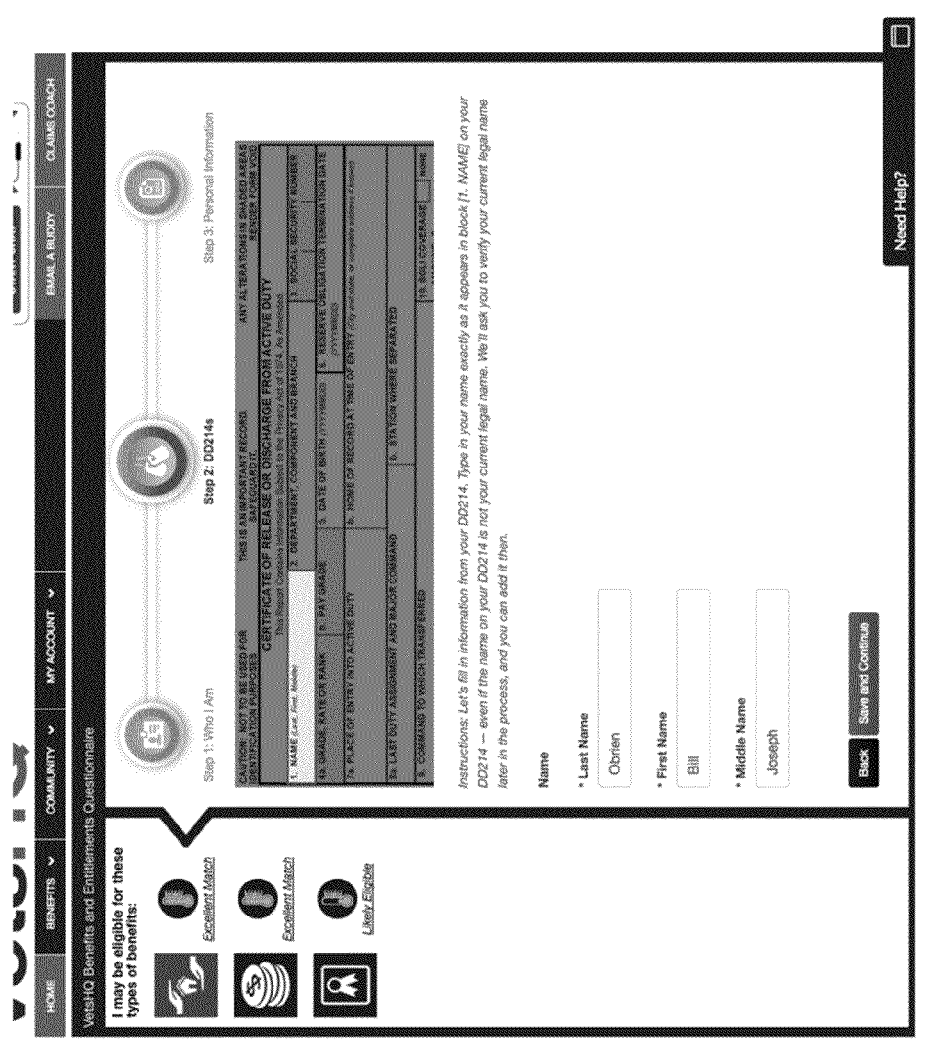
Figure 26E:
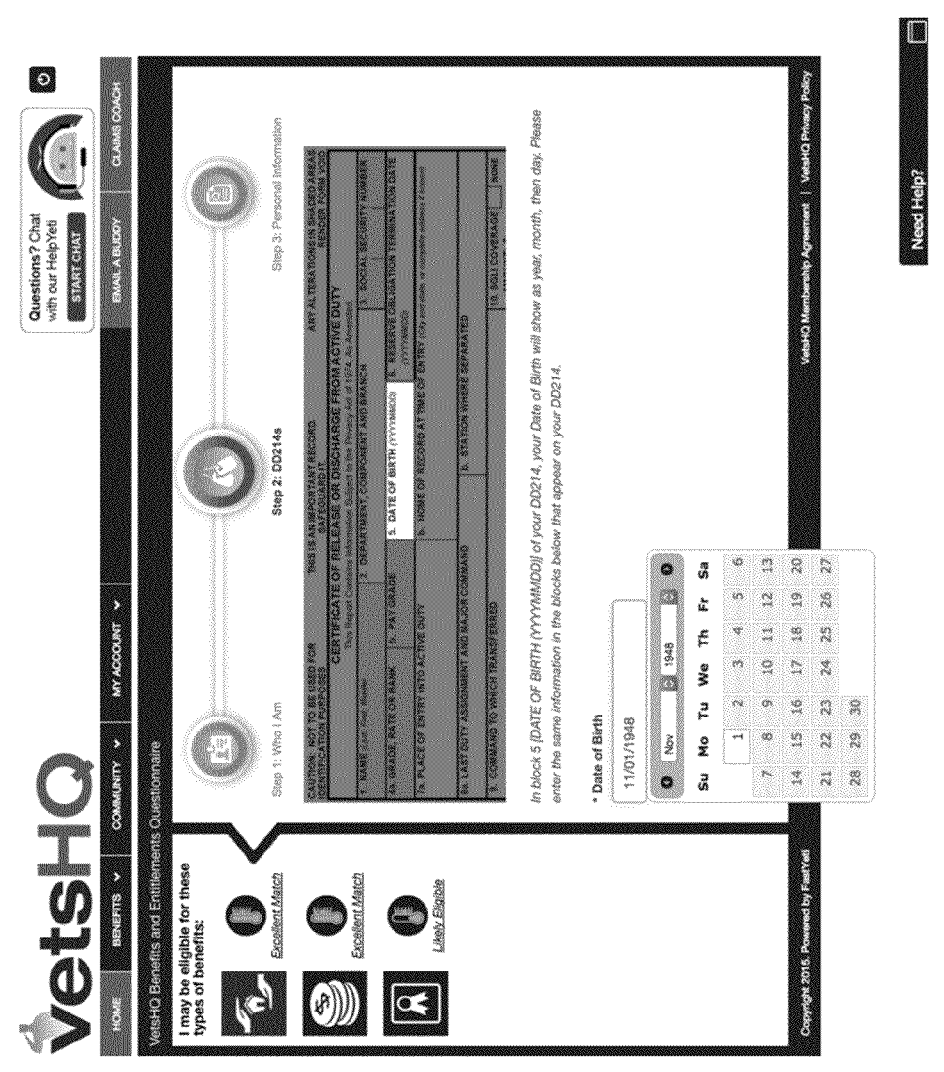
Figure 26F:

When the user selects "Save and Continue" from the bottom of the page the user then is presented with screens for entering information from the DD-214 form, which begins with the screenshot of FIG. 26B. The screen of FIG. 26B indicates whether the user has previously provided a copy of the DD-214 and provides the option to upload other copies. The copy of the DD-214 could have been previously provided through the website or the mobile application.

When the user selects the "Add Another DD214" option at the bottom of the screen of FIG. 26B the user is then prompted to select the version of the DD-214 that most closely resembles their form. These options can include any or all of the forms illustrated in FIGS. 20A-20H.

Figure 26G:
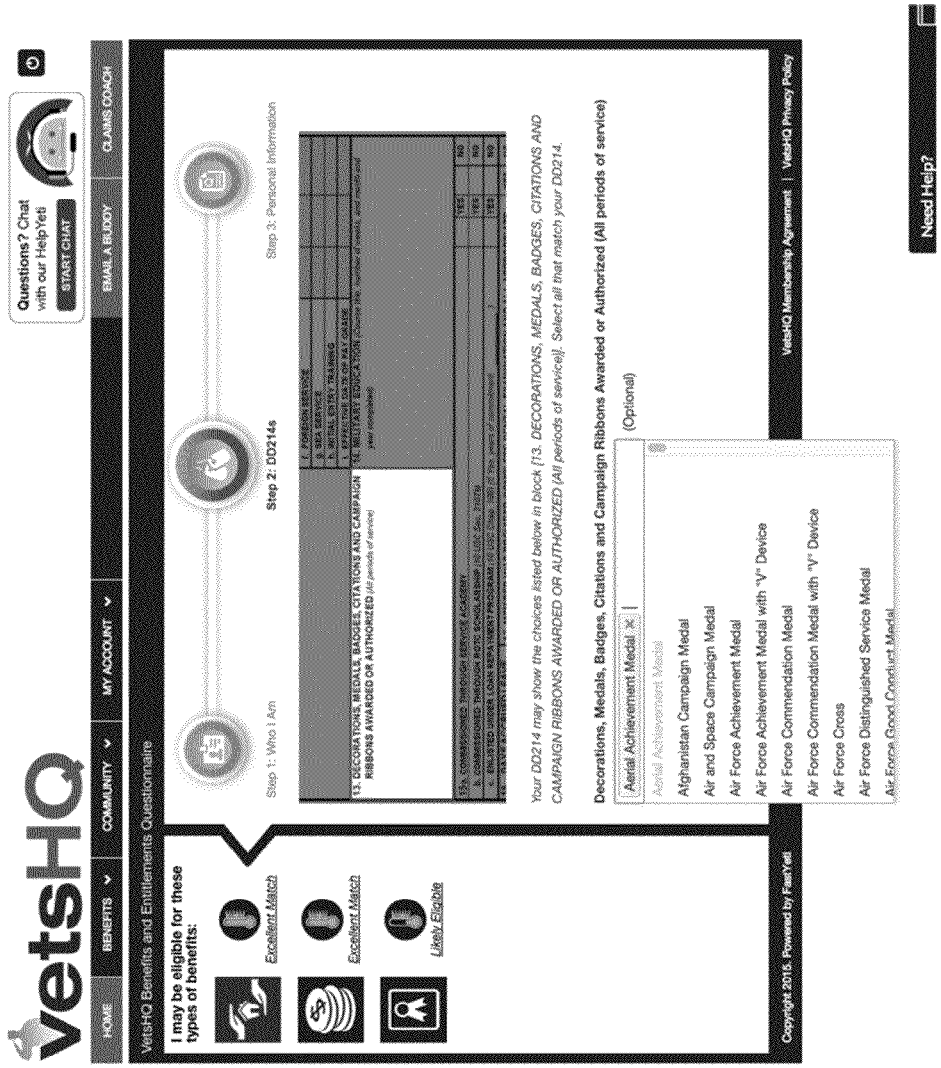
Figure 26H:
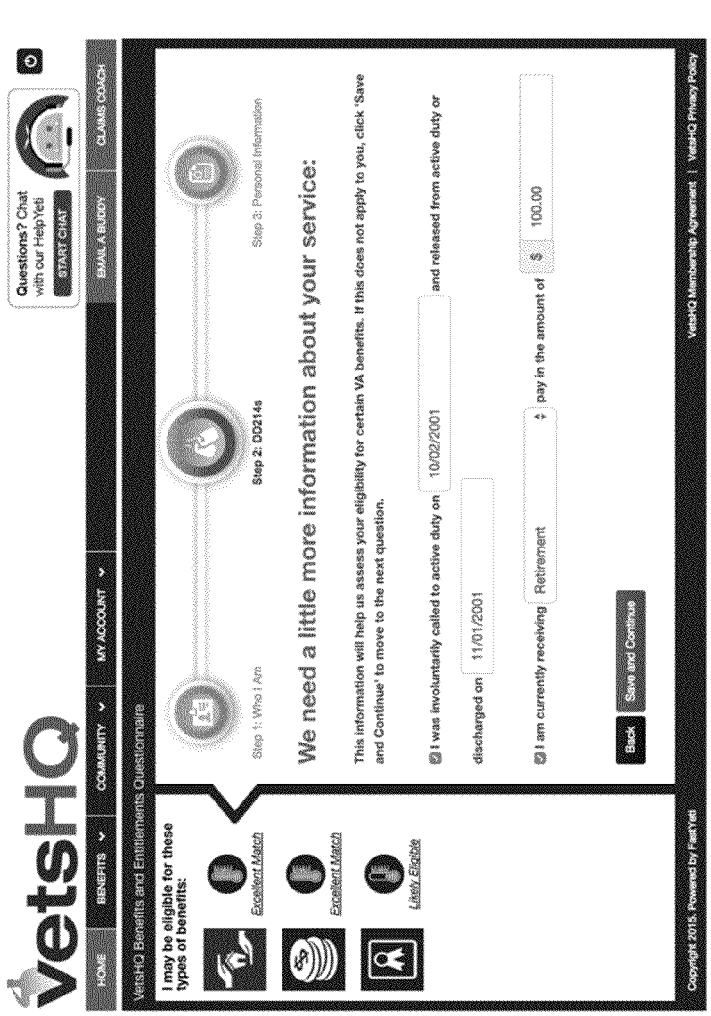

After the user has selected the form most closely resembling their form the user is then prompted to input data from the form. As illustrated in FIGS. 26C-26G the screens prompting the user for information from the DD-214 can include a portion of the DD-214 highlighting where this information can be found. Because the user has previously indicated which version of the DD-214 they received, the portion of the form presented will reflect the particular version that the user received from the military. The information can be entered as free text (FIGS. 26D and 26F), using structured inputs for dates (FIG. 26E), and/or using drop-down pick lists (FIG. 26G). The user then provides the date when he/she was called to active duty, the discharge date, as well as any compensation currently being received, as well as the amount of compensation, which employs the screen illustrated in FIG. 26H.

Figure 26I:
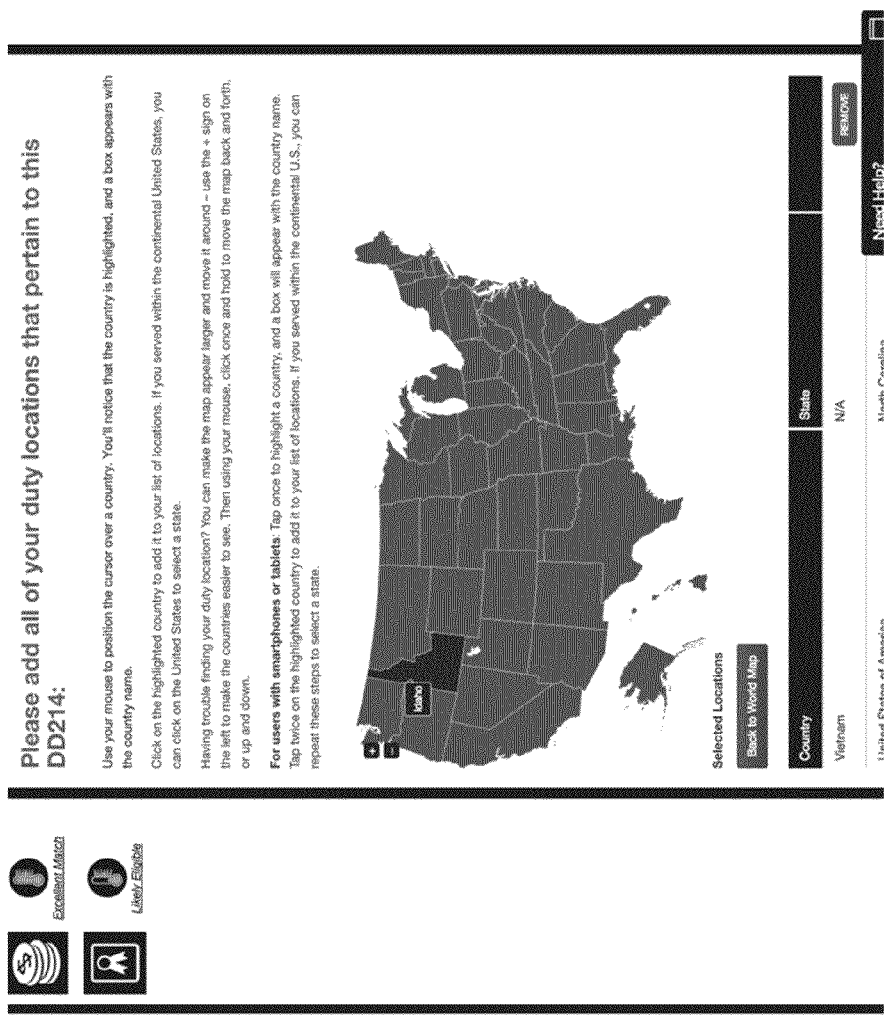
Figure 26J:
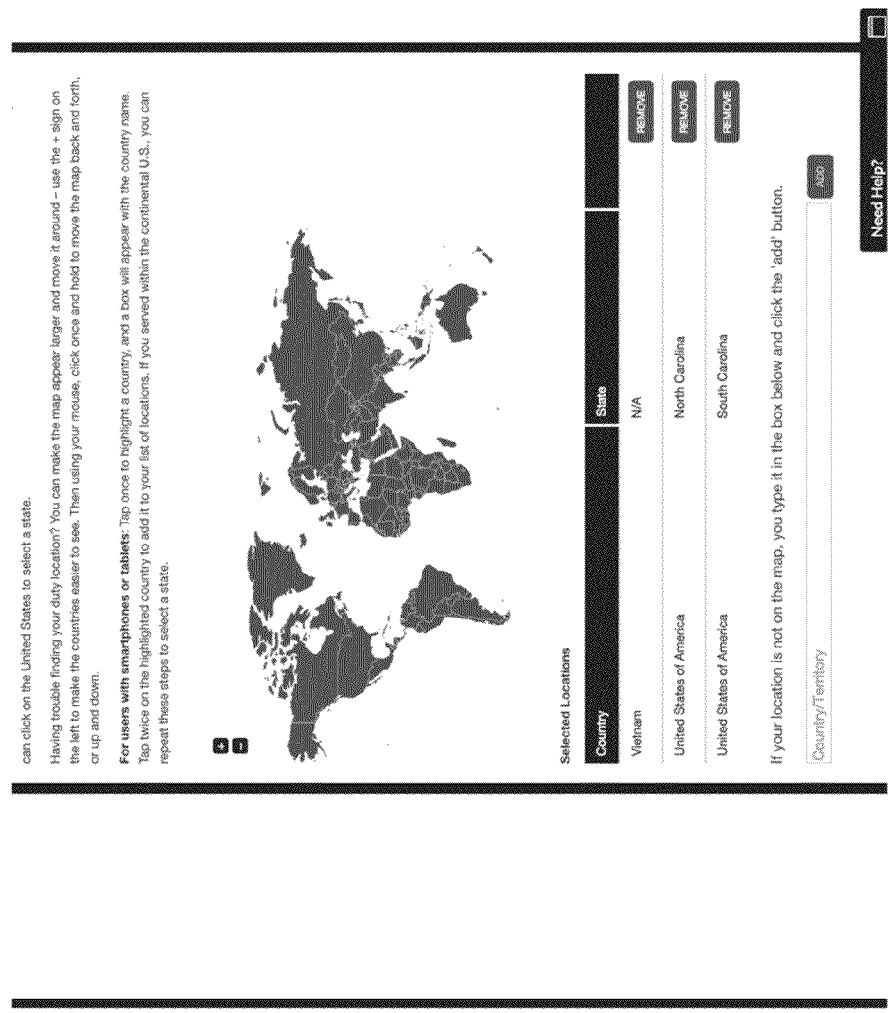
Figure 26K:
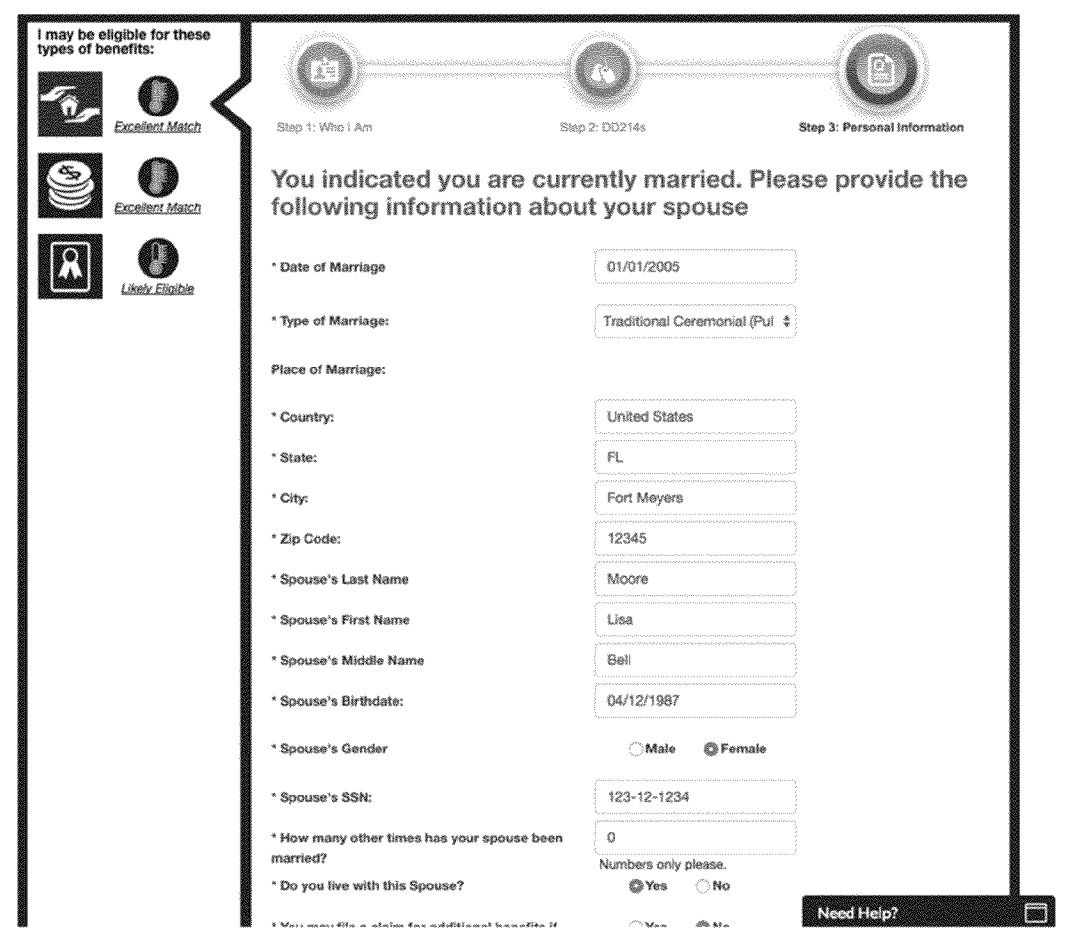
Figure 26L:
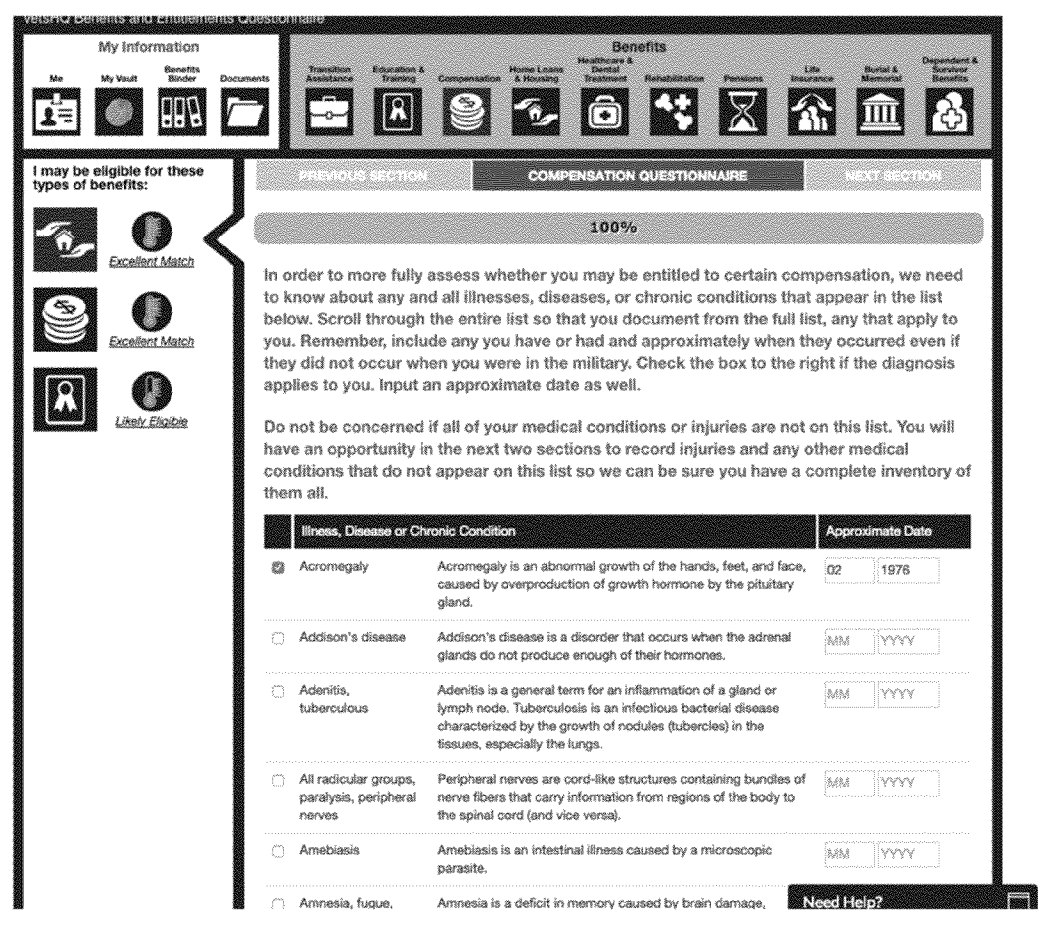
Figure 26M:
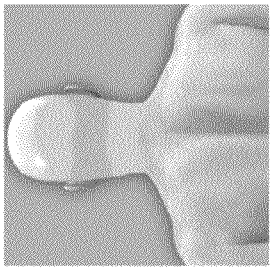

After the user has entered all of the information from the DD-214 the user is presented with screens to obtain additional information necessary for making the eligibility determination. For example, as illustrated in FIGS. 26I and 26J, the user identifies all duty locations pertaining to the DD-214.

After completing the information about the DD-214 the user then provides personal information using the screen of FIG. 26K. The user also identifies any medical conditions using the screens of FIGS. 26L and 26M.

The initial questionnaires that are required to perform the benefit eligibility determination include the initial information, the DD-214, and the personal information. The eligibility determination can also involve additional, optional questionnaires, relating to compensation, education and training, home loans and housing, transition assistance, healthcare and dental, rehabilitation, pensions, life insurance, burial and memorial, and dependent and survivor benefits. The questionnaires used in connection with the present invention can be highly dynamic. For example, based on a number of pre-defined rules/conditions, an answer to one question or a group of questions can unlock additional questions or pages of questions. The questions can vary from simple true/false questions to very detailed (e.g., identification of every location on a person's body subject to an injury or illness, along with interactive images, lists of conditions, and descriptions).

The combination of the user's responses along with the predefined rules/conditions results in a number of different unique paths that a user can traverse while completing the questionnaire. For example, using the DD-214, there are eight different versions of this form, and thus eight different paths through the rest of the questionnaire. There are a total of 217 questions that may be asked in a DD-214 questionnaire, and 49 rules/conditions that control the user's path through the questionnaire. Many of these conditions are binary sending the user down one of two different paths, whereas other questions (e.g., "How many dependents do you have?") trigger repeated sub-questionnaires (e.g., once for each of the veteran's dependents). Putting aside the repeated sub-questionnaires, there are $8*(2^{49})=4,503,599,600,000,000$ different paths through the DD-214 questionnaire.

Figure 27A:
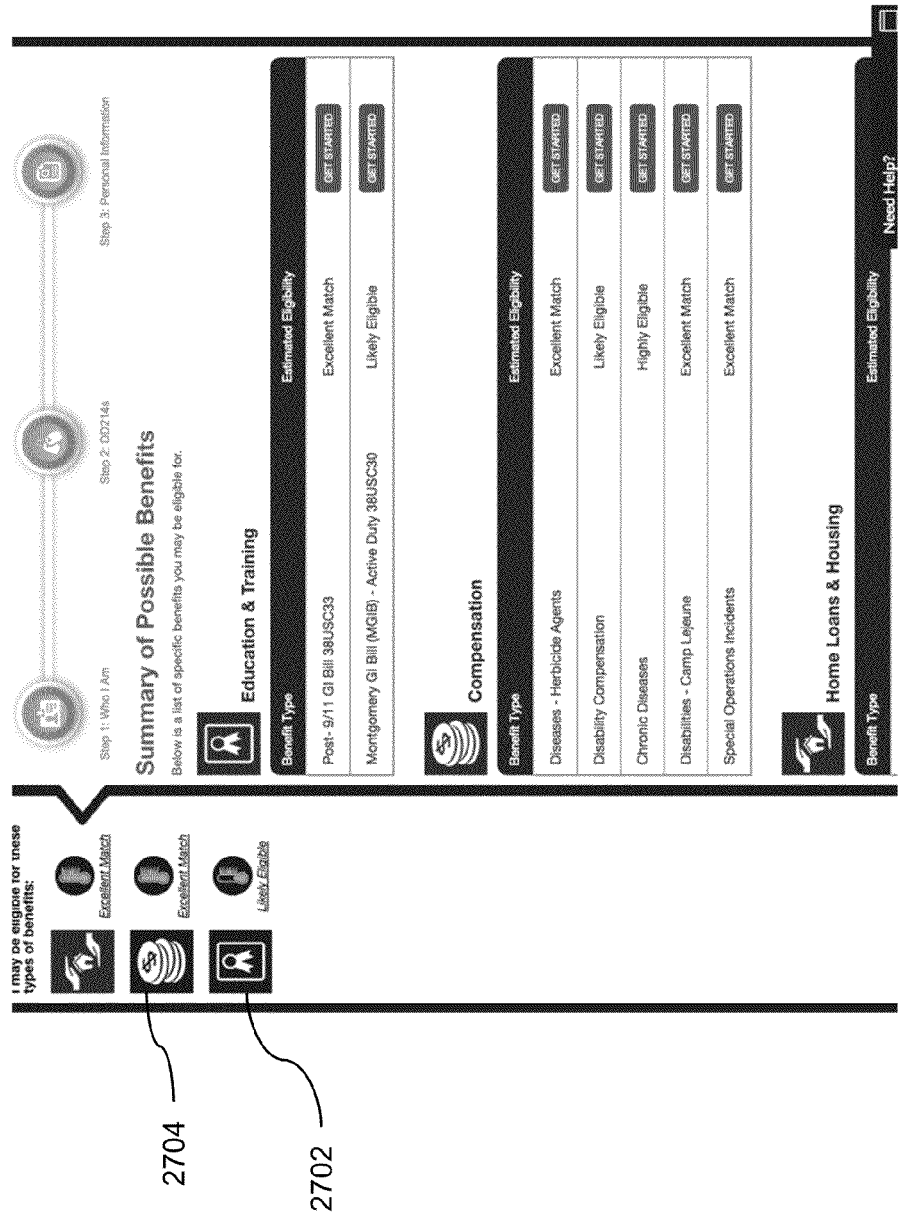
Figure 27B:
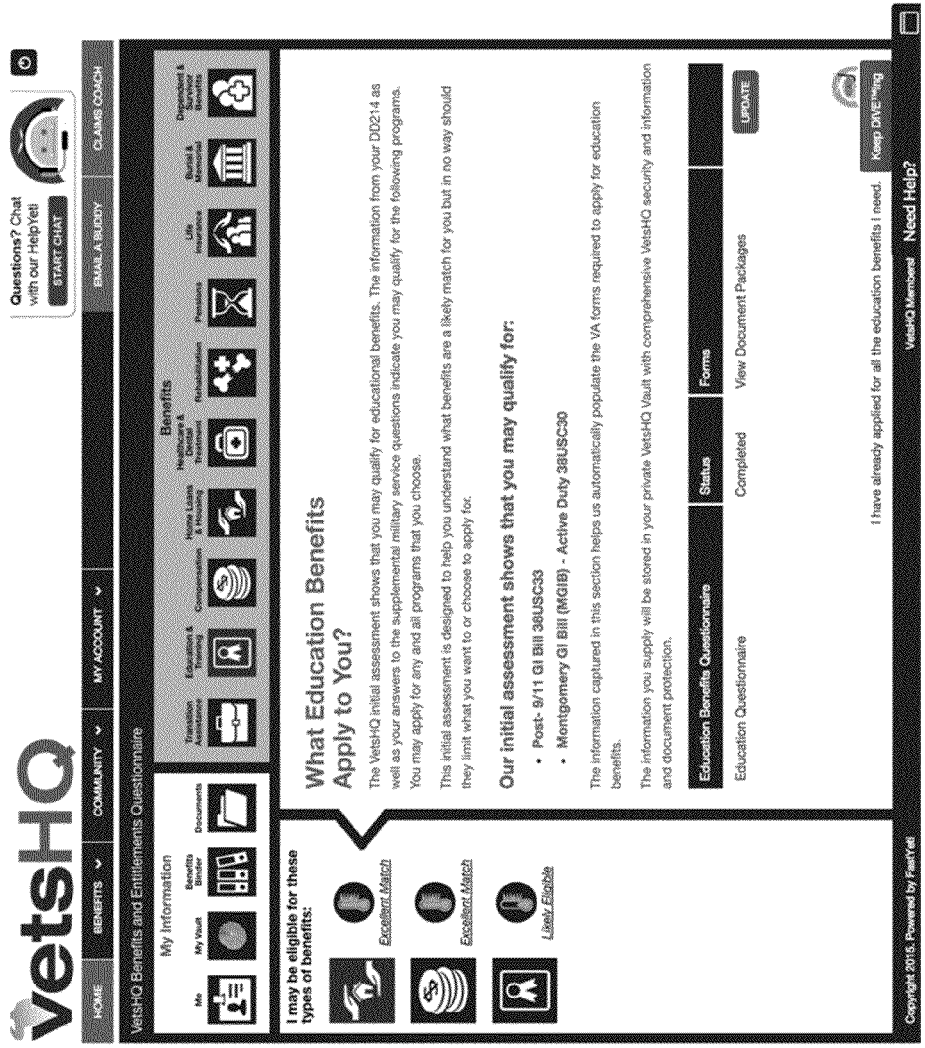
Figure 27C:
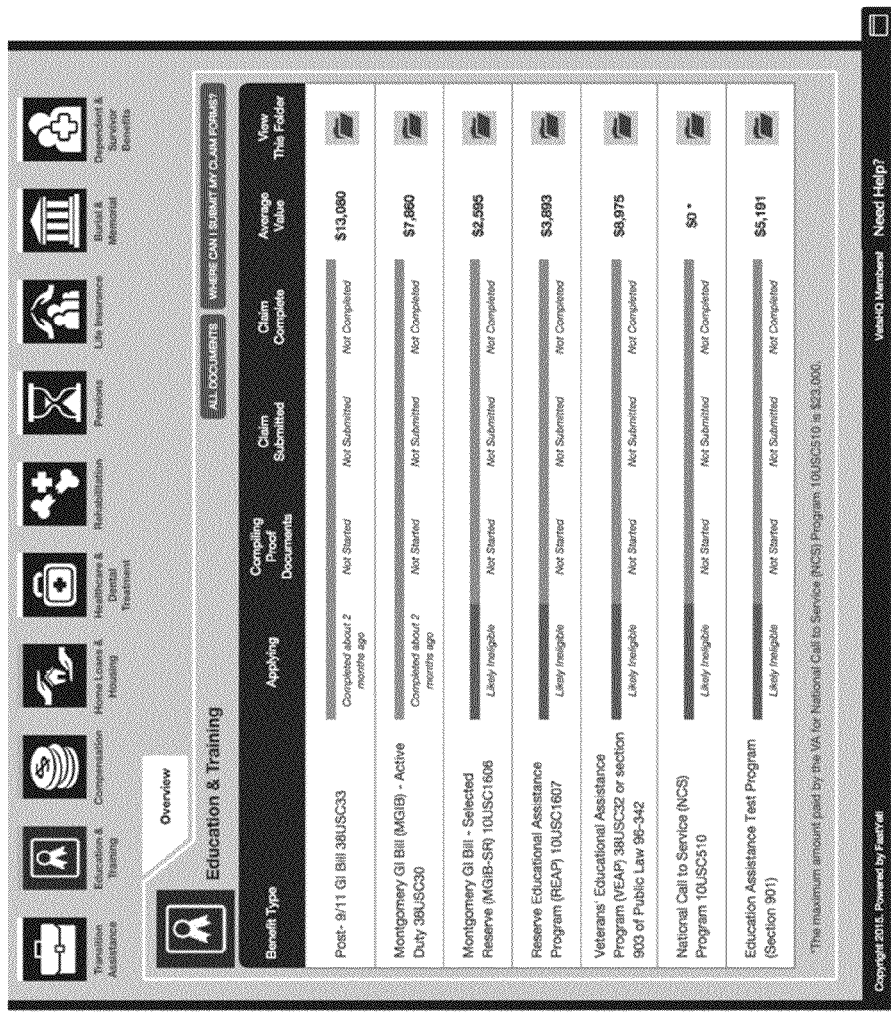

After completing the forms the user is presented with a summary of possible benefits, which is illustrated in FIGS. 27A-27F. FIG. 27A illustrates an exemplary start page for the summary of possible benefits. If the user selects the education and training option 2702, the user is presented with the screen of FIG. 27B to identify the education benefits being applied for. Selecting the "View Document Packages" under the "Forms" column takes the user to the screen illustrated in FIG. 27C, which lists various types of available benefits, the status of applying for the benefit, and provides a link to the folder containing the forms for the particular benefit.

Figure 27E:
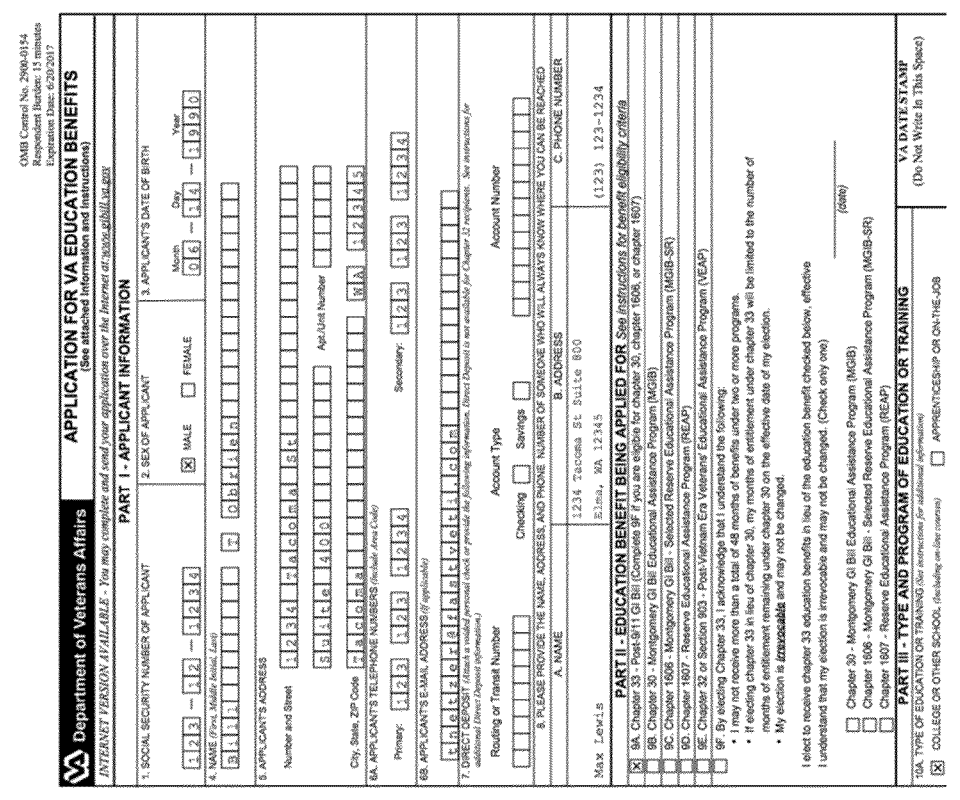
Figure 27F:
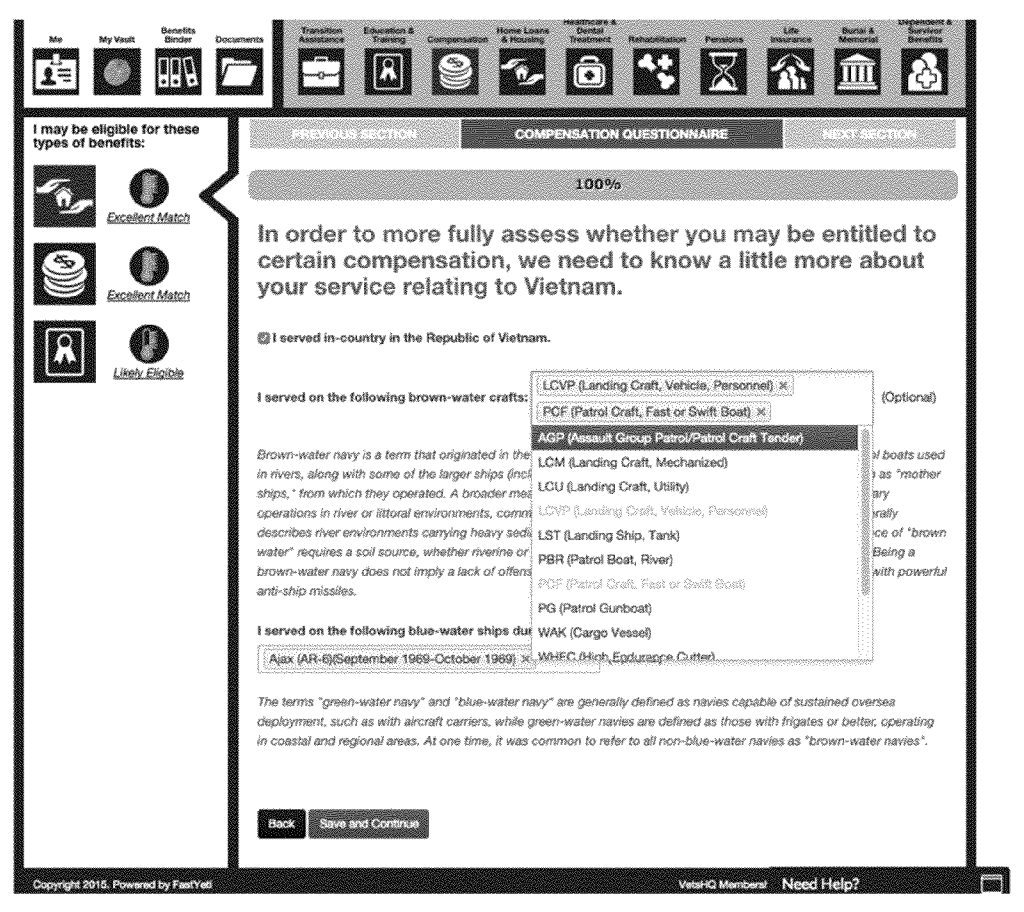

If the user selects the compensation option 2704, the user is presented with the screen of FIG. 27D to identify the compensation benefits being applied for. As illustrated in FIG. 27D, the system can automatically generate the compensation benefits forms using data from the DD-214, as well as any additional information provided by the user. Selecting the "Download" option would present the user with a screenshot of the particular form, an example of which is illustrated in FIG. 27E.

In certain situations the system may require additional information to determine eligibility for certain compensation benefits. For example, the type of ship the veteran served on in Vietnam can affect the type and/or amount of compensation, which information can be input using the screen of FIG. 27F.

Although exemplary embodiments of the present invention have been described using various screenshots for a mobile application and a website, the present invention is not limited to these particular screens and can employ additional screens, less screens, and/or different screens, to collect information for benefit eligibility and identify potential eligibility.

Although exemplary embodiments of the present invention have been described in connection with an overall process of capturing data from a form to determine eligibility for benefits, parts of the overall process are inventive in their own right and can be employed in other types of processes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
    displaying imager data and guides defining a rectangle on a screen of a device that includes a processor;
    determining, by the processor, whether the imager data satisfies predetermined criteria, wherein the predetermined criteria includes at least a largest four point contour within the imager data is within a predetermined size relative to the rectangle defined by the guides, wherein while determining whether the imager data satisfies the predetermined criteria, the method further comprises outputting feedback on a display related to the predetermined criteria;
    automatically capturing an image when the imager data satisfies the predetermined criteria;
    identifying, by the processor, a document contained in the captured image;
    separating, by the processor, the document into separate data field images;
    recognizing, by the processor, text in each of the separate data field images;
    automatically identifying a form in the imager data based on the recognized text in one of the separate data field images; and
    determining eligibility for one or more benefits based on the recognized text in the separate data field images.

2. The method of claim 1, wherein the processor and imager are components of an end-user, mobile device and the determination of eligibility is performed by the mobile device.

3. The method of claim 1, wherein the processor and imager are components of an end-user, mobile device and the determination of eligibility is performed by a centralized server.

4. The method of claim 1, wherein the predetermined criteria also includes whether the image is in focus.

5. The method of claim 1, wherein the recognition of the text involves using a custom dictionary of words.

6. The method of claim 5, wherein the custom dictionary only includes predetermined words expected to appear on the form.

7. The method of claim 1, further comprising:
    performing, by the processor, a four-point image perspective transformation on the identified document contained in the captured image; and
    correcting, by the processor, an aspect ratio of the transformed, captured image.

8. The method of claim 1, wherein the separation of the document into separate data field images comprises:
    analyzing, by the processor, a layout of the document; and
    performing recursive horizontal and vertical line detection to break the document into individual row images and then breaking the individual row images into individual data field images.

9. The method of claim 1, wherein the determination of eligibility comprises:
    applying the recognized text in the separate field images to a set of eligibility rules; and
    outputting a relatively likelihood of qualifying for the one or more benefits on the display.

10. The method of claim 1, wherein the identified form is a particular version of a form document having a plurality of different versions, wherein a layout of data or a type of data varies between the different versions.

11. The method of claim 10, wherein the recognition of the text involves using a custom dictionary of words that only includes predetermined words that appear on the different versions.

12. The method of claim 1, further comprising:
receiving a set of rules;
identifying rules impacting the benefit eligibility determination;
synthesizing the identified rules into a logical structure,
wherein the determination of eligibility involves comparing the recognized text in the separate data field images with the logical structure.

13. The method of claim 1, wherein the separation of the document into separate data fields includes converting the captured image to grayscale and then thresholding the image to a binary image.

14. The method of claim 13, wherein the separation of the document into separate data fields further includes detecting edges within the binary image as lines and removing lines below a predetermined error margin.

15. The method of claim 1, further comprising:
receiving, by the processor, input of text, wherein the eligibility determination is also based on the received text.

16. The method of claim 1, wherein the display of imager data comprises:
receiving, by the processor, a first number of frames of imager data per second; and
discarding a number of frames of imager data per second to result in a second number of frames per second, wherein the displayed imager data consists of the second number of frames per second.

17. The method of claim 1, further comprising:
scaling, by the processor, dimensions of the imager data, wherein the determination of whether the imager data satisfies the predetermined criteria is based on the scaled imager data.

* * * * *